United States Patent [19]

Dunstan

[11] Patent Number: 5,205,123
[45] Date of Patent: Apr. 27, 1993

[54] INFINITELY VARIABLE DIFFERENTIAL HYDROSTATIC TRANSMISSION

[76] Inventor: Phillip E. Dunstan, 1022 S. 208th, Seattle, Wash. 98198

[21] Appl. No.: 812,425

[22] Filed: Dec. 23, 1991

Related U.S. Application Data

[63] Continuation-in-part of Ser. No. 578,743, Sep. 6, 1990, abandoned.

[51] Int. Cl.$^5$ ............................................. F16D 39/00
[52] U.S. Cl. .......................................... 60/487; 60/488; 60/489; 91/476; 91/477; 91/184; 91/189 A; 91/505; 91/506; 92/12.2; 418/60
[58] Field of Search .............. 60/487, 488, 489, 490; 418/30, 107, 108, 160; 91/477, 476, 189 A, 184, 505, 506; 92/181 P, 184, 12.2; 277/138, 148, 165

[56] References Cited

U.S. PATENT DOCUMENTS

| | | | |
|---|---|---|---|
| 661,384 | 11/1900 | Prendgrast | 277/148 X |
| 1,274,391 | 8/1918 | Davis | 60/489 |
| 1,659,374 | 2/1928 | Robson | 91/505 X |
| 2,172,141 | 9/1939 | King | 277/148 X |
| 2,260,867 | 10/1941 | Rappl | 418/160 X |
| 2,492,688 | 12/1949 | Dall | 91/477 |
| 2,545,929 | 3/1951 | Orshansky | 91/505 X |
| 2,570,843 | 10/1951 | Orshansky | 60/489 |
| 2,678,536 | 5/1954 | Morgan | 91/477 X |
| 2,967,491 | 1/1961 | Wiggermann | 91/505 |
| 3,175,363 | 3/1965 | Molly | 60/488 X |
| 3,314,234 | 4/1967 | Oshansky | 91/477 X |
| 3,881,557 | 5/1975 | Gendron et al. | 92/181 P X |
| 3,909,015 | 9/1975 | Kasahara | 277/81 P |
| 4,235,116 | 11/1980 | Meijer et al. | 417/222 X |
| 4,337,951 | 7/1982 | Perego | 277/173 X |
| 4,365,374 | 12/1982 | Bennett | 91/189 A X |
| 4,669,958 | 6/1987 | Peyran et al. | 416/114 |
| 4,854,125 | 8/1989 | Inoue | 60/487 |
| 4,860,540 | 8/1989 | Hayashi et al. | 60/487 |
| 4,944,154 | 7/1990 | Kawahara et al. | 60/487 X |

FOREIGN PATENT DOCUMENTS

| | | | |
|---|---|---|---|
| 628472 | 4/1936 | Fed. Rep. of Germany | 92/12.2 |
| 1919510 | 10/1970 | Fed. Rep. of Germany | 91/477 |
| 308201 | 1/1930 | United Kingdom | 277/138 |
| 477028 | 12/1937 | United Kingdom | 60/487 |

OTHER PUBLICATIONS

Catalogue No. 11-880, Eaton Model 6, 7, and 11 Hydrostatic Transmissions, Mar. 1985, pp. 1-16.
Catalogue No. 1109-B, ABGX Axial Piston Pump, Jun. 1984, pp. 1-12.
Catalogue No. 7-122, Eaton Repair Information, Jun. 1983, pp. 1-19.
Catalogue No. 5-401, Eaton Application Information, Jun. 1983, pp. 1-32.
Catalogue No. 11-866, Eaton Hydrostatic Transmissions, Jun. 1983, pp. 1-16.

Primary Examiner—Edward K. Look
Assistant Examiner—Todd Mattingly
Attorney, Agent, or Firm—Seed and Berry

[57] ABSTRACT

An infinitely variable differential hydrostatic transmission utilizing a fixed displacement pump/motor and a variable displacement pump/motor interconnected with appropriate valving, to provide a mechanical/hydraulic differential drive which is capable of achieving an overall efficiency in the 98°-99° range. In the preferred embodiment, which utilizes axial piston type pump motors, pistons in multiples of four are utilized in order that each piston will have a piston located 90° from it to serve as its control valve. The fixed and variable displacement motor/pump are provided as an integral unit containing bearing mountings, cylinder barrels, valve ports, piston seal mountings, hydraulic flow passages, pressure reservoirs and manifolding by forming a series of individual segments and sealing them together into a single structural unit. A unique mounting arrangement is utilized to positively attach the pistons to an anti-friction swashplate which eliminates all side loads on the piston. Finally, a novel piston valve seal reduces hydraulic leakage and sliding friction, and a novel pumping device is utilized for pressurizing the pump motor units and replacing fluid lost through leakage.

20 Claims, 22 Drawing Sheets

FIG. 4

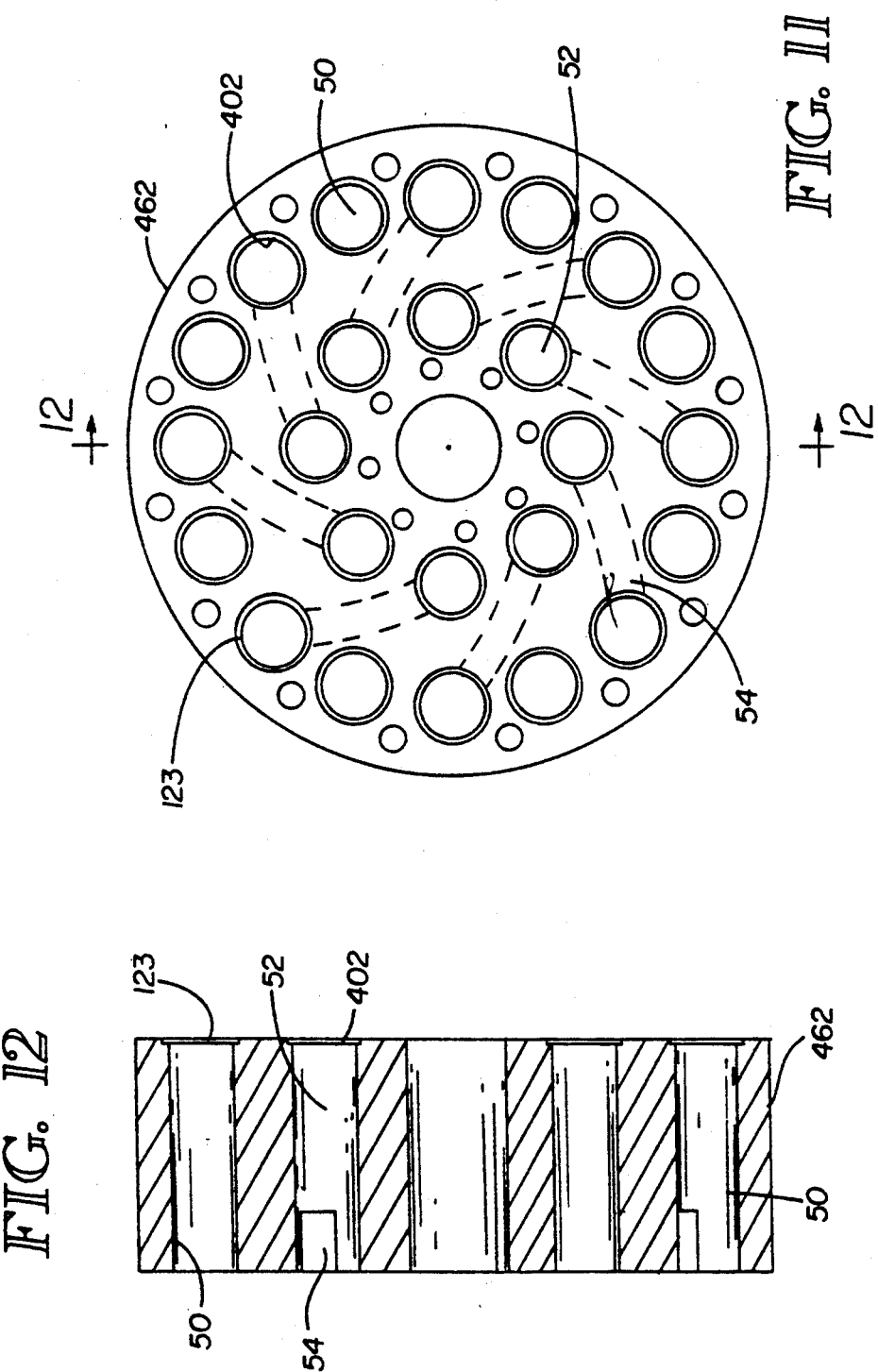

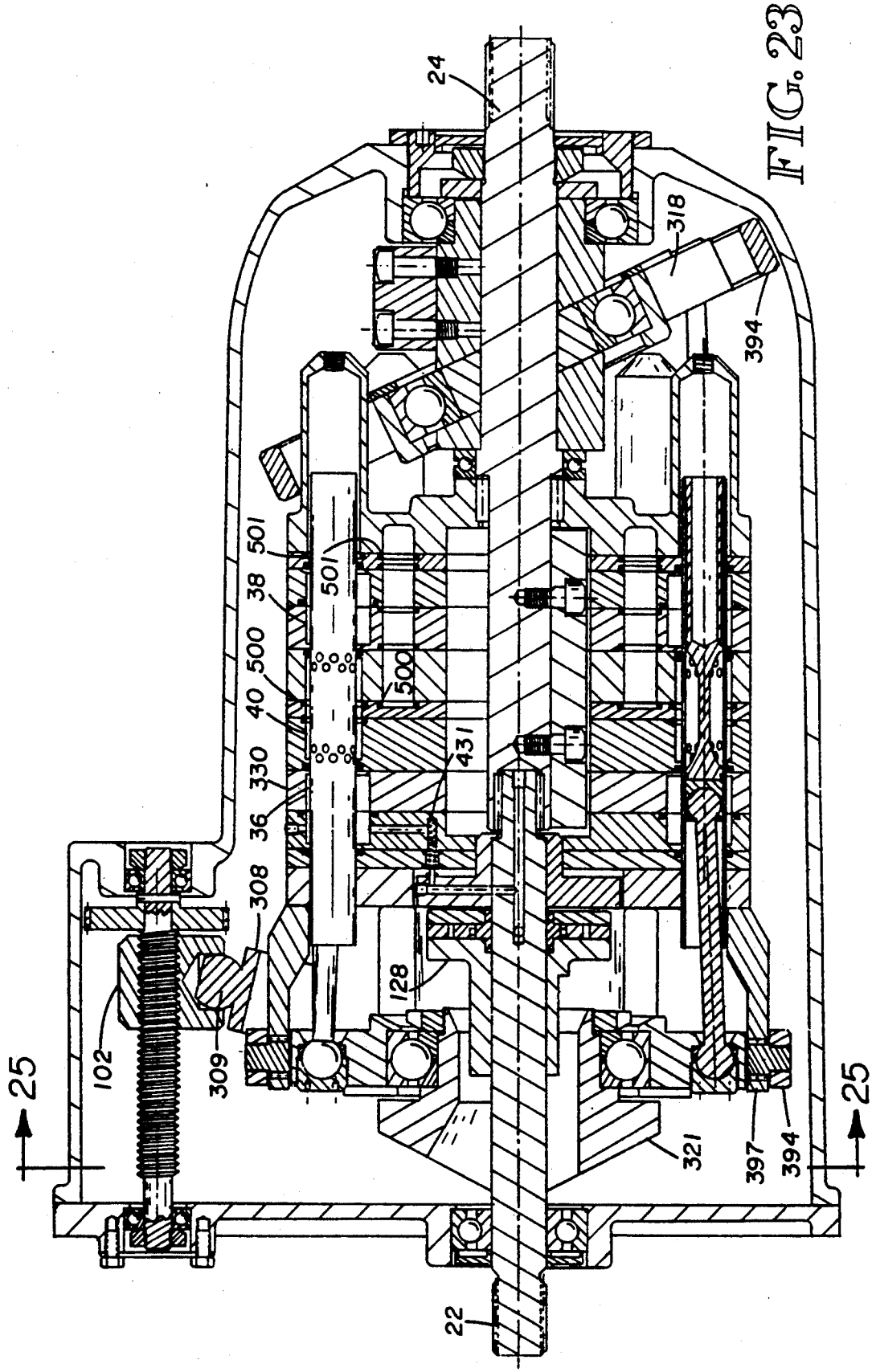

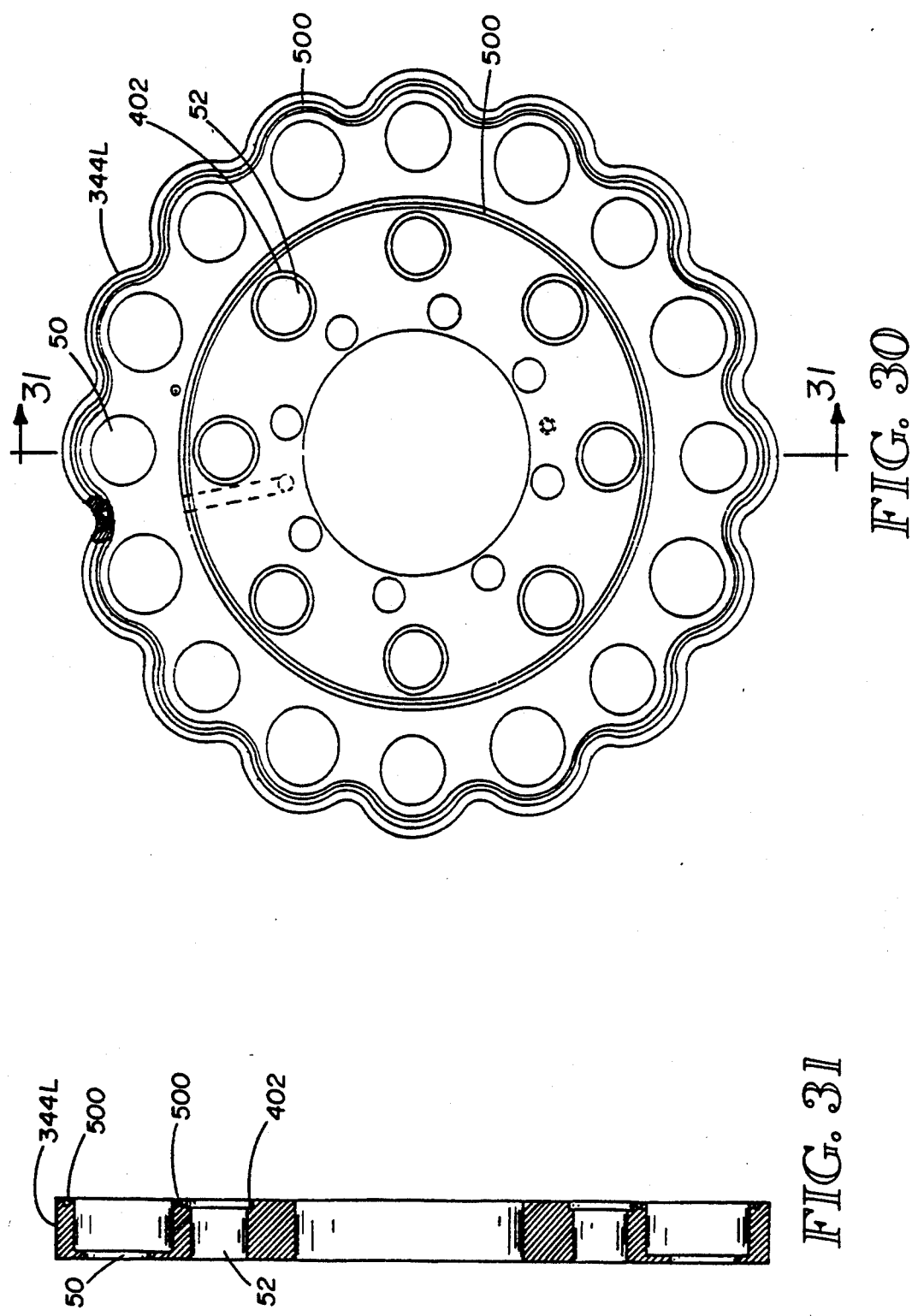

INFINITELY VARIABLE DIFFERENTIAL HYDROSTATIC TRANSMISSION

CROSS-REFERENCE TO RELATED APPLICATION

This application is a continuation-in-part of U.S. Ser. No. 07/578,743, filed Sep. 6, 1990, now abandoned.

TECHNICAL FIELD

This invention relates to a hydrostatic transmission and, more particularly, to an infinitely variable differential hydrostatic/mechanical transmission having a high efficiency.

BACKGROUND OF THE INVENTION

Conventional devices for generating mechanical power such as internal combustion engines, electric motors and gas turbines operate efficiently within a fairly narrow range of output speeds. Most vehicles, boats, elevators, machine tools, conveyors, generators, etc., have widely varying speed torque requirements. To date, no completely satisfactory device has been devised for accomplishing efficient matching of the speed and torque requirements between a motor and a load. Vehicles use either mechanical or hydraulic clutches with transmissions having gear ratios ranging from 2 to 18. Machine tools often use belt pulley transmissions. Machines, such as elevators, which require a continuous variable smooth transition from zero to full speed are limited to the use of D.C. motors. Finally, machines that require smooth variation between fixed lower and upper gear ratios commonly employ pulley belt drives which vary the effective pitch diameter of the pulleys. These, however, are bulky and are capable of handling only limited horsepower.

Hydrostatic drives employing a variable displacement pump and a fixed displacement motor are capable of providing precisely controlled infinitely variable ratios from zero to full speed at horsepowers up to 500. However, the maximum efficiency achieved by the presently known hydrostatic drives ranges from 70% to 75% at full load, seriously limiting their application. In many cases where the energy loss could be tolerated the cooling system required to dissipate the loss becomes too cumbersome and expensive.

The conventional hydrostatic transmission employs a variable displacement hydraulic pump, a fixed displacement hydraulic motor, and flow lines connecting the hydraulic pump to the hydraulic motor, a variable swashplate rotatably secured to an input shaft for controlling the stroke of the pump pistons and, therefore, the flow rate of the hydraulic fluid from the pump to the motor so as to cause the motor pistons to oscillate, and a fixed swashplate for converting the reciprocation of the motor pistons to rotation of an output shaft. In the neutral position, the variable swashplate is disposed perpendicular to the longitudinal axes of the pump pistons such that rotation of the input shaft and the variable swashplate does not cause the reciprocation of the pump pistons, and, therefore, no fluid flows to the hydraulic motor. As the angle of the variable swashplate is increased, the reciprocating stroke of the pump pistons correspondingly increases causing the motor pistons stroke to increase at the same rate. The increasing reciprocating stroke of the motor pistons causes the fixed swashplate and the output shaft to rotate at an increasing speed. When the angle of the adjustable swashplate is equal to the angle of the fixed swashplate, the output shaft rotates at the same speed as the input shaft. In this condition, there is a maximum amount of fluid flowing from the hydraulic pump to the hydraulic motor resulting in the maximum hydraulic losses, and correspondingly, minimum efficiency.

SUMMARY OF THE INVENTION

This invention is a novel means of providing an infinitely variable differential hydrostatic/mechanical drive which is capable of full load, full speed efficiencies in the 98% efficiency range.

In the preferred embodiment, the present invention is an infinitely differential hydrostatic transmission, comprising an outer case; an input shaft and an output shaft rotatably disposed in the case; a first unit having a plurality of first pistons respectively slideably disposed in a plurality of first piston chambers therein, the first unit being fixedly attached to the input shaft so as to rotate therewith; a second unit having a plurality of second pistons respectively slideably disposed in a plurality of second piston chambers therein, the second unit being fixedly attached to the input shaft so as to rotate therewith; a first swashplate means connected to the first pistons and to the output shaft for converting oscillatory motion of the first pistons to rotational movement of the output shaft and vice versa, the first swashplate means being disposed at an angle with respect to the longitudinal axis of the first pistons; a second swashplate means connected to the second pistons for converting rotational movement of the second unit into oscillatory motion of the first pistons and vice versa, the second swashplate being angularly adjustable from a first position to a second position and being rotatably fixed to the outer case; means for communicating the second piston chambers with the first piston chambers and vice versa such that fluid pumped from the first piston chambers flows into the second piston chambers and fluid from the second piston chambers flow into the first piston chambers wherein the output speed and output torque of the output shaft is controlled by adjusting the angular position of the second swashplate means between the first position and the second position so as to correspondingly adjust the fluid displacement of the second unit with respect to the first unit; and means for controlling the angle of the second swashplate means to provide an infinite range of output shaft speeds and torques.

When the second swashplate means is disposed perpendicular to the longitudinal axes of the second pistons and when the input shaft and the second unit rotate, the second pistons are hydraulically prevented from sliding by the second swashplate means thereby hydraulically preventing the first pistons from moving and correspondingly causing the first pistons to cause the first swashplate means and the output shaft to rotate at the same speed as the input shaft. On the other hand, when the second swashplate means is disposed at an angular position where the fluid displacement of the first and second units are equal, and when the input shaft and the second unit are rotated in a first direction, all of the fluid in the second piston chambers flows into the first piston chambers and vice versa such that the first swashplate means and the output shaft rotate in a second direction opposite the first direction at the same speed as the input shaft so as to have a net output speed of zero.

Further, when the second swashplate means is disposed at an angular position where the fluid displacement of the second unit is greater than the fluid displacement of the first unit, and when the input shaft and the second unit are rotated in a first direction, the output shaft rotates in a second direction reverse to the first direction at a speed greater than the rotational speed of the input shaft resulting in the output shaft rotating in the second reverse direction with respect to the case. Finally, when the second swashplate means is disposed at an angular position where the fluid displacement of the second unit is less than the fluid displacement of the first unit, and when the input shaft and the second unit are rotated in a first direction, the output shaft rotates in a second direction reverse to the first direction at a speed slower than the rotational speed of the input shaft resulting in the output shaft rotating in the first direction with respect to the case at the slower speed, the output torque of the output shaft increasing proportionally, over the torque of the input shaft, with the speed reduction.

In the preferred embodiment of the invention, the hydraulic fixed displacement unit and the hydraulic variable displacement unit are designed as a hydraulically linked unitary structure. According to the invention, the communicating means includes a control valve means for controlling the flow of fluid from the fixed displacement unit piston chambers to the variable displacement unit piston chambers and vise versa. The control valve means comprises each of the pistons, the pistons disposed 90° forward in the stroke or behind in the stroke, acting as a spool valve for controlling the flow of fluid into and out of each of the piston chambers. The communicating means specifically comprises a first reservoir circumscribing each of the piston chambers and communicating with one another to form a single reservoir circumscribing the transmission, a second reservoir circumscribing each of the piston chambers and communicating with one another to form a single reservoir circumscribing a transmission, a valve port circumscribing each of the independent piston chambers and being disposed between the first and second reservoirs, and a plurality of flow channels respectively connecting the piston chambers to the valve ports circumscribing the pistons disposed 90° in either the forward or backward direction in the stroke, wherein each of the pistons has an annular recess disposed therein which acts to connect either the first or second reservoir to the valve port, depending on the stroke position of the piston, such that each of the piston chambers connects with either the first or the second reservoir, depending on the position of the piston.

Accordingly, the unique hydrostatic transmission allows the output torque and speed to be controlled by adjusting the angular orientation of the first swashplate assembly.

BRIEF DESCRIPTION OF THE DRAWINGS

FIG. 4 is a sectional side view of the invention taken along line 4—4 of FIG. 1;

FIGS. 11-18 are detailed views of the individual plates which combine to form the structural body of the transmission of the present invention;

FIG. 23 is a sectional side view taken along 23—23 of FIG. 21.

FIGS. 26 through 35 are detailed views of the individual transverse sections which combine to form the unitary cylinder barrel core structure.

DETAILED DESCRIPTION OF THE INVENTION

Figure 1:
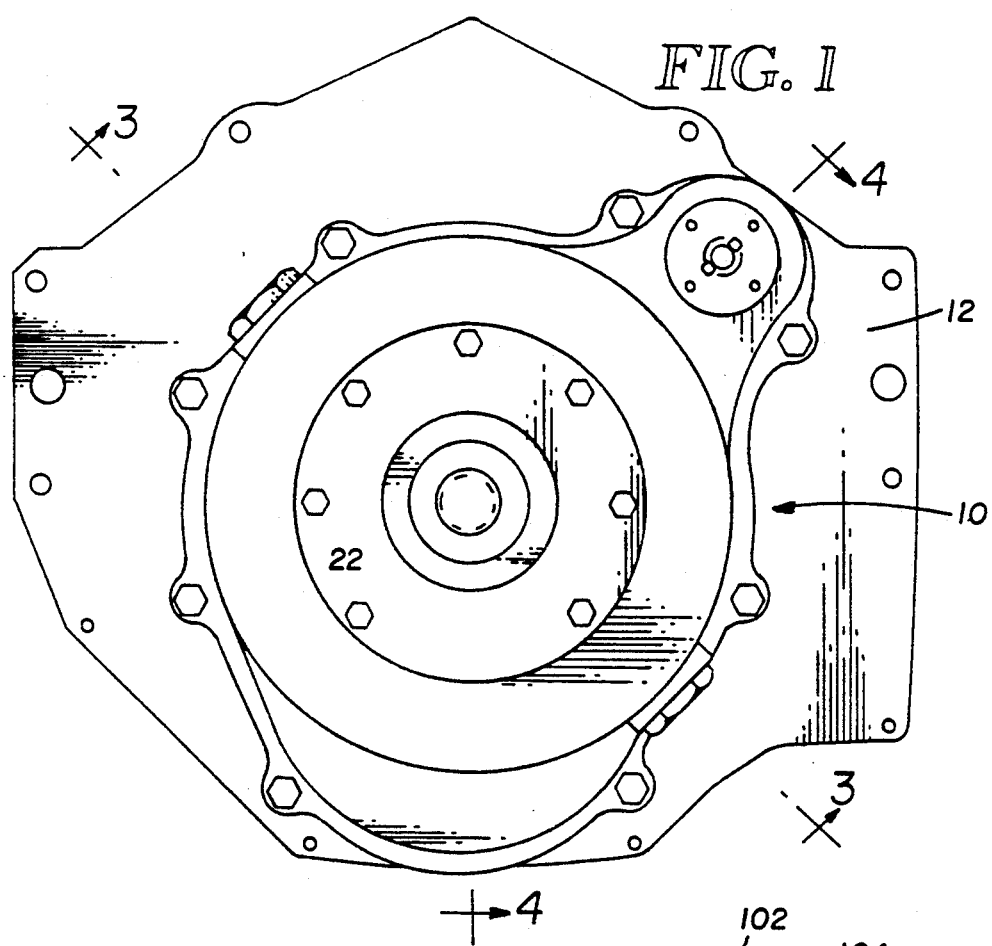
FIG. 1 is rear view of the transmission of the present invention.

Referring to FIG. 1, the present invention is directed toward an infinitely variable differential hydrostatic transmission which can be utilized to transmit mechanical power generated by internal combustion engines, electric motors, or gas turbines at any desired speed or torque to suit the requirements of the driven load. FIG. 1 specifically illustrates the transmission ready for installation in an automobile. Referring thereto, the variable differential hydrostatic transmission 10 is secured to a housing 12 which bolts to an engine (not shown) and is driven by the drive shaft of the engine.

Figure 2:
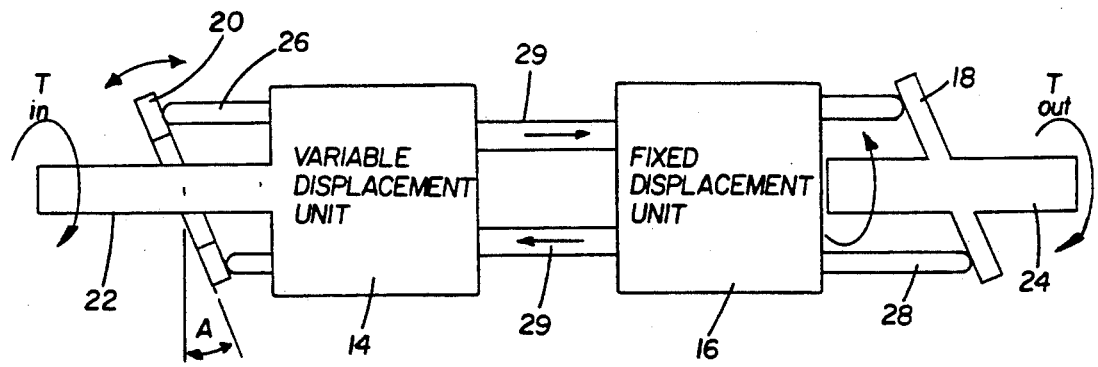
FIG. 2 is a schematic illustration of the invention.

FIG. 2 is a schematic illustration of the transmission for the purpose of explaining the operation of the transmission. Referring thereto, the transmission generally includes a variable displacement unit 14, a fixed displacement unit 16, a fixed swashplate 18, variable swashplate 20, and input 22 and output 24 shafts. The term "variable displacement unit" as used herein refers to a hydraulic unit which intermittently acts as either a pump or a motor, the hydraulic displacement of which is controlled. . Contrastingly, the term "fixed displacement unit" as used herein refers to a hydraulic unit which intermittently acts as either a pump or a motor, the hydraulic displacement of which is fixed. The variable displacement unit 14 and fixed displacement unit 16 are keyed to the input shaft 22 so as to rotate therewith. The swashplate 18 is angularly fixed as contrasted to the variable swashplate 20 which is angularly adjustable. The output shaft 24 is keyed to the fixed swashplate 18 so as to be rotatable therewith. In contrast, the variable swashplate 20 is rotatably fixed to the outer case 35 (FIG. 3) such that is it not free to rotate. The variable displacement unit 14 and fixed displacement unit 16 each have a plurality of pistons 26, 28, respectively, slideably disposed therein. As will be described in detail below, there is communication (schematically illustrated in FIG. 2 as reference numeral 29) between the piston chambers of the variable displacement unit 14 and the piston chambers of the fixed displacement unit 16.

In this design the pistons of both the fixed displacement and variable displacement units are equal in diameter, therefore, the hydraulic displacement of the fixed displacement unit 16 is equal to the hydraulic displacement of the variable displacement unit 14 when the swashplate angle of the variable swashplate 20 is equal to the angle of the fixed swashplate 18 For simplicity the operation of the transmission has been described in terms of swashplate angles. If different size pistons were used, the angles and resulting displacement would vary accordingly.

An input torque is applied to the input shaft 22 to thereby rotate both the variable displacement unit 14 and the fixed displacement unit 16 as well as the variable displacement unit pistons 26 and fixed displacement unit pistons 28. As noted above, the variable swashplate 20 is angularly adjustable. When the variable swashplate 20 is disposed at an angle a which is the same as the angular orientation of the fixed swashplate 18, all of the fluid in the transmission is continuously pumped from the variable displacement unit piston chambers to the fixed displacement unit piston chambers and vice versa. In this condition, the variable displacement unit 14 is functioning as a pump driving the fixed displacement unit 16, which is operating as a motor, in a reverse direction at the same speed as the input speed, resulting in the output shaft speed being zero.

In contrast, when the variable swashplate 20 is disposed in the perpendicular position, at zero degrees perpendicular to the pistons axes, there is no reciprocating action of the variable displacement unit pistons 26 generated by the variable swashplate 20 upon rotation of the input shaft 22. Therefore, since the variable displacement unit pistons 26 are locked axially in a fixed position, the hydraulic fluid can not flow from the variable displacement unit piston chambers to the fixed displacement unit piston chambers, or vise versa, thereby hydraulically locking the fixed displacement unit pistons 28 in the position illustrated. Since, as noted above, the fixed displacement unit 16 and its pistons 28 are rotated by rotation of the input shaft 22, the fixed displacement unit pistons 28 drive the output shaft 24 via the fixed swashplate 18 causing the output shaft to rotate at the same speed as the input shaft 22.

Finally, when the adjustable swashplate 20 is disposed at an angle "A" such that the stroke of the variable displacement unit pistons 26 is one-half the stroke of the fixed displacement unit pistons 28, and when a torque is applied to the input shaft 22 and a resisting torque is applied to the output shaft, a quantity of pressurized fluid equal to one half the displacement of the fixed displacement unit will be accepted by the variable displacement unit driving the variable displacement unit as a motor. This fluid flow allows the output shaft to rotate at one half the speed of the input shaft.

The fluid flowing between the fixed and variable displacement units 14, 16 is being pumped by the fixed displacement unit 16 to the variable displacement unit 14. Variable displacement unit 14 in this instance is functioning as a motor generating a torque equal to the input torque, which is reacted through the variable, nonrotating portion of swashplate 20. This torque is added to the input torque, resulting in the available output torque being doubled. Moreover, as the angle of the variable swashplate 20 approaches the angle of the fixed swashplate 18, the output torque Tout approaches infinity, limited by leakage of the hydraulic fluid and the mechanical strength of the transmission.

Having described the theory behind the operation of the invention, the detailed description of the invention follows. While the variable displacement unit 14 and fixed displacement unit 16 can be independent units, according to the preferred embodiment of the invention, the variable displacement unit 14 and fixed displacement unit 16 are constructed as a single drive unit 30, illustrated in FIG. 3. Slideably disposed in the unit 30 are the variable displacement unit pistons 26 and the fixed displacement unit pistons 28. In the preferred embodiment of the invention, the variable displacement unit 14 and fixed displacement unit 16 each have eight pistons spaced 45° apart, the fixed displacement unit pistons 28 being separated from the variable displacement unit pistons 26 by an angle of 22.5°. However, pistons in any multiple of four, such as four or twelve could be used as well.

Figure 3:
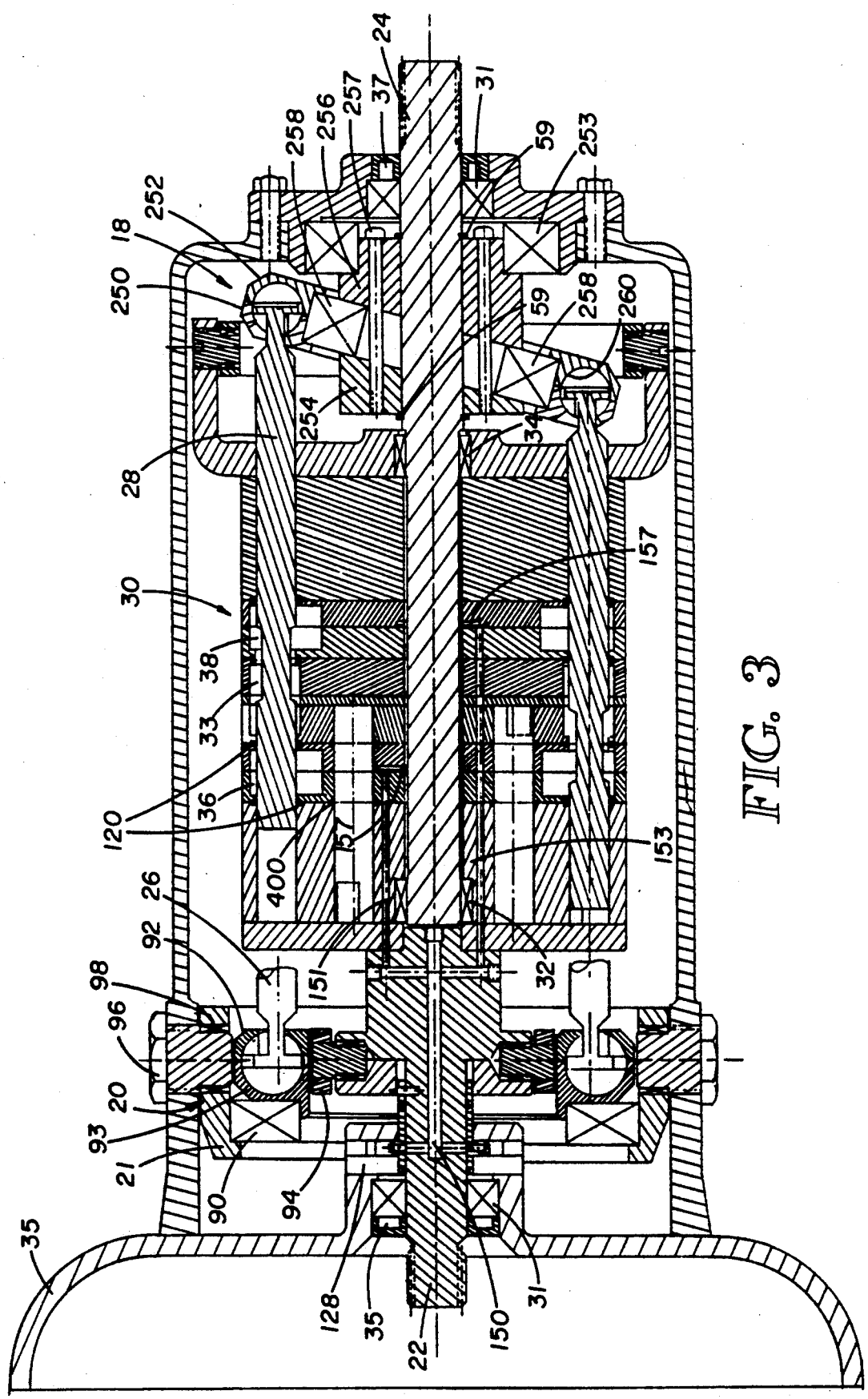
FIG. 3 is a sectional side view of the invention taken along line 3—3 of FIG. 1.
Figure 4:
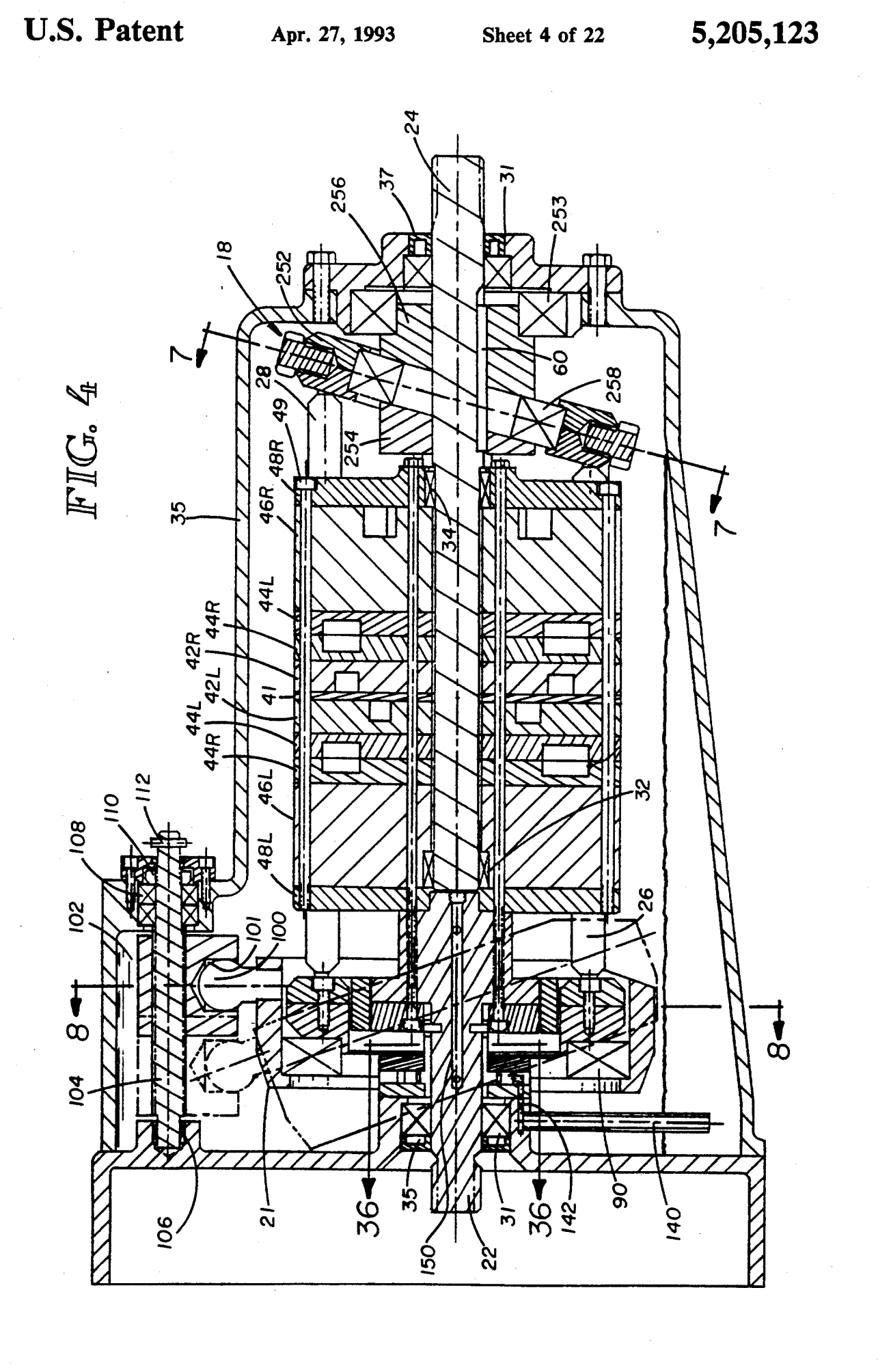

Referring to FIGS. 3 and 4, the protruding ends of the variable displacement unit pistons 26 are connected to the variable swashplate 20 while the protruding ends of the fixed displacement unit pistons 28 are connected to the fixed swashplate 18. A unique means for connecting the pistons to the swashplates is described below.

As noted above, the unit 30 is fixedly connected to the input shaft 22 such that upon rotation of the input shaft, the unit 30, as well as the variable displacement unit pistons 26 and fixed displacement unit pistons 28, rotate therewith. The input shaft 22 is rotatably supported by support bearings 31 disposed at opposite ends of the unit. The output shaft 24 is axially disposed in the unit 30 and is rotatable in relation thereto on internal bearings 32 and 34, and end support bearing 31. As further noted above and as described in detail below, the output shaft 24 is fixedly connected to the fixed swashplate 18 such that rotation of the swashplate 18, generated by reciprocation of the fixed displacement unit pistons 28, causes the output shaft 24 to correspondingly rotate, and vice versa. Oil seals 35 and 37 are provided around the input shaft 22 and output shaft 24, respectively, for preventing fluid from leaking from the transmission.

Referring to FIGS. 3 and 4, the fixed swashplate 18 is designed in the following manner. The fixed swashplate 18 includes a pair of swashplate rings 250, 252, a pair of alignment collars 254, 256, and a bearing 258. The bearing alignment collars 254 , 256 are fixed to the output shaft 24 by shaft key 60 (FIG. 4). The alignment collars retain the inner race of the bearing 258 using bearing clamp bolts 257. The alignment collars 254, 256 are rotatably supported by thrust bearings 253, the inner race of the thrust bearing being secured to the alignment collars and the outer race bearing secured to the case 35, as illustrated. Shaft retention snap rings 59 retain the position of the bearing alignment collars on the output shaft. The outer race of the bearing 258 is clamped between the swashplate rings 250, 252. Therefore, as output shaft 24 is rotated, the inner race of the bearing 258 is correspondingly rotated causing the outer race, when restrained from rotating, to generate a sinusoidal oscillating motion in the axial plane, forcing the fixed displacement unit pistons 28 to move in the axial direction. Conversely, axial reciprocating movement of the fixed displacement unit pistons 28 causes the outer race to move in a sinusoidal manner causing the inner race and output shaft 24 to rotate.

Figure 5:
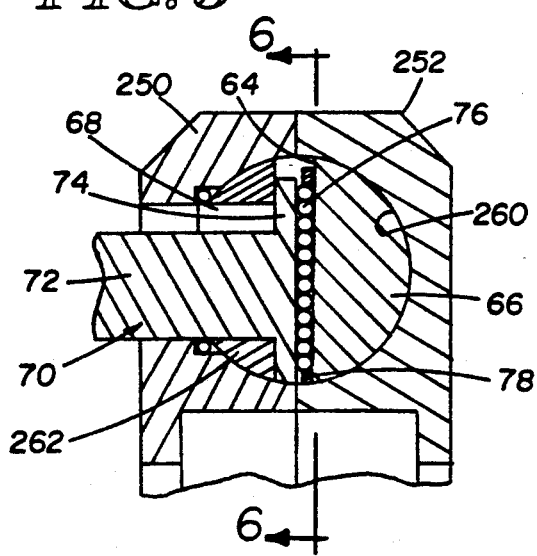
FIG. 5 is a detailed view of the technique for connecting each of the pistons to the swashplates, according to the present invention.
Figure 6:
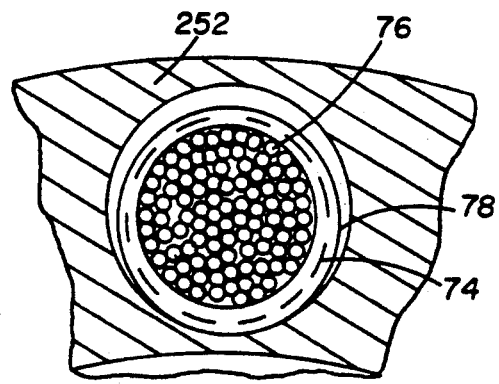
FIG. 6 is a sectional view taken along line 6—6 of FIG. 5.

Swashplate rings 250, 252, in combination, have a plurality of spherical cavities 260 corresponding to the number of fixed displacement unit pistons for receiving the ends of the pistons, as best illustrated in FIGS. 3, 5 and 6. Disposed within each cavity 260 of the swashplate ring 252 is a hardened steel ball segment 262 having the shape of a half-sphere including a flat smooth finished surface 64 facing each of the pistons. The cavities of the other swashplate ring 250 also have a hardened steel ball segment 66 which includes a hole 68 disposed normal to the flat surface. Each of the pistons includes an end fitting 70 disposed at the end thereof for engaging each of the cavities. In particular, each end fitting 70 includes a shank portion 72 and a circular flat portion 74. The flat portion 74 is disposed inside each of the cavities 260 between the flat surfaces of each of the segments 262, 66 and the shank portion 72 extends through the hole 68 in each of the ball segments 66 and is threadably secured to each of the pistons. A plurality of hardened steel balls 76 are contained in the space between the flat portion 74 of the end fitting 70 and the flat surface 64 of the segment 262. A ring 78 circumscribes the balls for retaining them in place.

As the angle between the longitudinal axis of the fixed displacement unit pistons 28 and the swashplate rings 250, 252 changes due to the oscillatory motion of the swashplate rings, the ball segments 66, 262 rotate within the spherical cavity 260 such that the force applied to the piston is always in the axial direction of the piston. Therefore, negligible side loads are applied to the pistons as the swashplate angle varies. Since the rotational axis of the swashplate is at an angle to the rotational axis of the main drive body, the contact point of the longitudinal axis of the piston traces an elliptical path in the rotational plane of the swashplate. Therefore, sliding occurs between the flat surface on the piston end fitting 70 and the flat surfaces of ball segments 66, 262. The balls provide an anti-friction bearing between the flat surfaces, as illustrated, to virtually eliminate the side loads that might be otherwise be caused by friction from this sliding motion.

Figure 20:
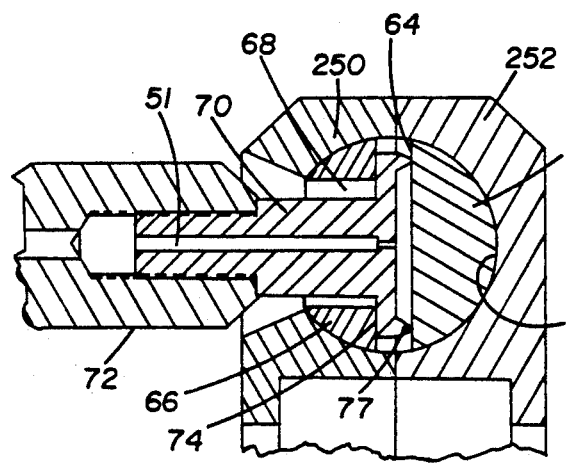
FIG. 20 is a detailed view of an alternative arrangement for connecting the pistons to the swashplates.
Figure 43:
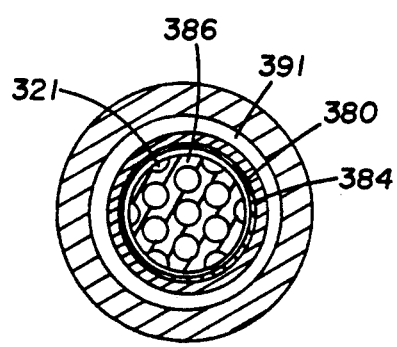
FIG. 43 is a detailed sectional view taken along line 43—43 of FIG. 24.

An alternate arrangement is illustrated in FIG. 20 where the flat portion 74 of the end fitting 70 has an annular skirt 77 for retaining the fluid supplied under pressure from the piston cavity through hole 51. The area enclosed by annular skirt 77 is just slightly less than the cross-sectional area of the piston. This results in most of the force exerted by the piston being reacted hydraulically with only the minimum force necessary to ensure a positive seal being transmitted to ball segment 262 through skirt 77.

Figure 7:
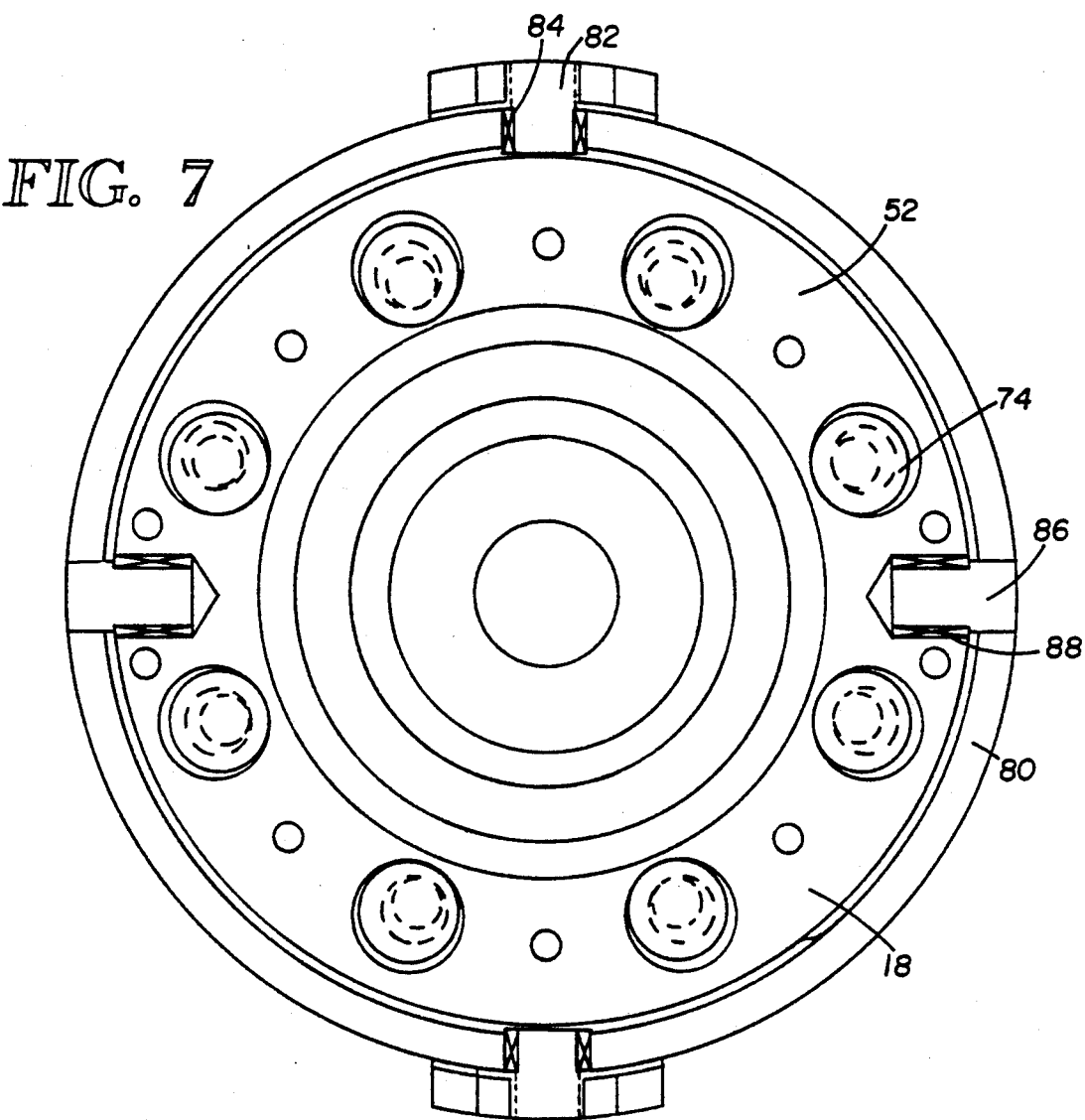
FIG. 7 is a front sectional view of a torque reaction ring taken along line 7—7 of FIG. 4.

Torque generated by the swashplate 18 must be reacted and transmitted to the drive unit 30. Conventional hydrostatic transmissions transmit this force through the pistons causing substantial side loads to be exerted on the pistons. To eliminate this side load, the swashplate rings 250, 252 of the fixed swashplate 18 are connected to the main drive unit 30 through a torque link ring mounting arrangement, illustrated in FIG. 7. The torque link ring arrangement includes a torque reaction ring 80 to which the swashplate 18 is rotatably secured such that the swashplate can be disposed at any angular position. In particular, referring to FIG. 7, the torque reaction ring 80 is rotatably secured to the main drive unit 30 utilizing pivot pins 82 and bearings 84. Correspondingly, the swashplate 18 is rotatably secured to the torque reaction ring 80 utilizing pivot pins 86 and bearing 88. The rotational axis of the torque reaction ring 80 with respect to the main unit 30 and the rotational axis of the swashplate 18 with respect to the torque reaction ring 80 are disposed 90° with respect to one another. Accordingly, the swashplate rings 250, 252 of the swashplate 18 are thereby rotationally rigidly fixed to the main drive unit 30 and the torque generated by the swashplate is reacted by the main drive unit 30 through the torque reaction ring mechanism and no side loads are placed on the pistons.

The torque reaction ring arrangement also serves to align the rotational axis of the swashplate 18 with the rotational axis of the main drive unit 30 both longitudinally and radially, while allowing the swashplate 18 to be positioned at any angle with respect to the rotational axis of the main drive body and output shaft 24. Accordingly, linear oscillatory motion and thrust of the fixed displacement unit pistons 28 is converted to rotary motion of the output shaft 24 through the swashplate 18 without developing any side load on the pistons. Conversely, rotary motion and torque applied at the output shaft 24 is converted to pumping motion of the pistons 28 without developing any significant side loads thereon.

The variable angle swashplate assembly is designed in the following manner. Referring again to FIG. 3, the variable angle swashplate assembly includes an outer swashplate ring 21, thrust bearings 90, inner swashplate rings 92, 93 and torque reaction ring 94. The outer swashplate ring 20 is rotatably mounted to the case 35. In particular, trunnions 96 are affixed to the case 35 and are fitted into bearing 98 provided in the outer swashplate ring 20. The outer race of the thrust bearing 90 is affixed to the outer swashplate ring 20 while the inner race is affixed to inner swashplate rings 92, 93. In this manner, the inner swashplate rings 92, 93 can rotate with respect to the outer swashplate ring 20. The end of each piston is attached to the inner swashplate rings 92, 93 in a manner similar that described above with regard to the fixed displacement swashplate.

Figure 8:
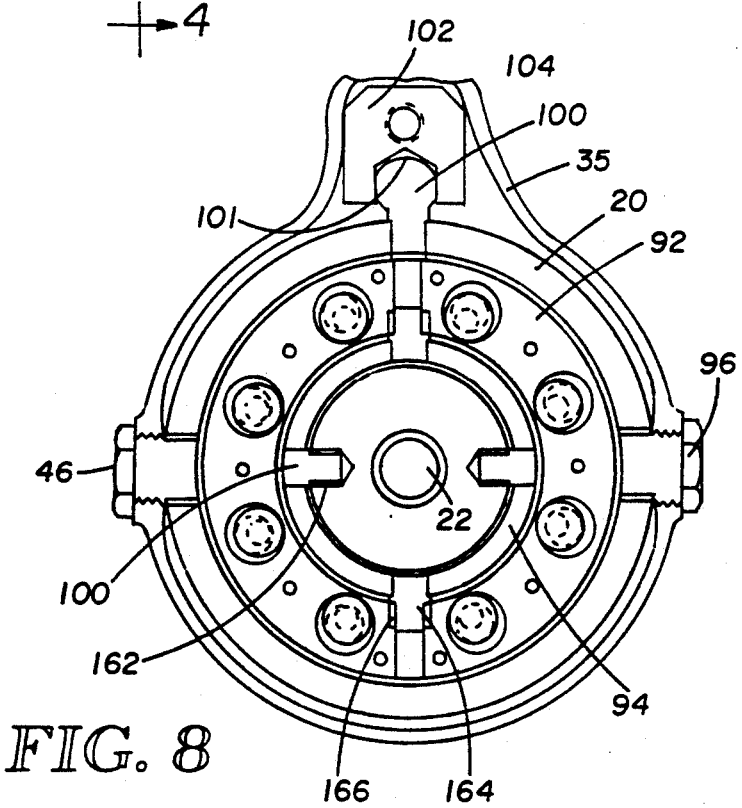
FIG. 8 is a rear sectional view through the variable angle swashplate taken along line 8—8 of FIG. 4, according to the present invention.

However, the torque reaction mounting of the variable displacement swashplate rings 92, 93 varies from the fixed displacement swashplate ring in that the torque reaction ring 94 is disposed inside the swashplate rings and is attached to the input shaft, as illustrated in FIGS. 3 and 8. Specifically, torque reaction ring 94 is pivotally attached to input shaft utilizing pivot pins 160 and bearings 162. Correspondingly, the torque ring is pivotally attached to the inner swashplate rings 92, 93 utilizing pivot pins 164 and bearings 166 disposed along an axis disposed ninety degrees from the axis of pivot pins 160.

As noted above, the magnitude of the oscillatory motion generated by the variable swashplate 20 is a function of the angle of the swashplate 20 with respect to the rotational axis of the drive unit 30. When the swashplate 20 is perpendicular to the main drive unit axis of rotation, zero oscillatory motion is generated and no fluid displacement by the pistons occurs. When the swashplate 20 is rotated about the trunnion pins 96 to the maximum desired angle, the oscillatory motion imparted to the pistons is the greatest and the maximum fluid displacement occurs.

The mechanism for controlling the variable displacement swashplate angle is shown in FIGS. 4 and 8. Referring thereto, the mechanism generally includes a ball fitting 100, drive nut 102, and drive screw 104. The ball fitting 100 is affixed to the variable angle swashplate 20 on a centerline perpendicular to the centerline of trunnion pins 96. The ball fitting 100 is fitted into a cylindrical socket 101 provided in the drive nut 102 which is threadably engaged with the drive screw 104. The drive screw 104 is rotatably disposed in the case 35 with one end of the drive screw being supported by roller bearing 106 and the other end being supported by thrust bearings 108 which are preloaded by nut 110 to fix the axial position of the drive screw 104. Pin 112 is provided for coupling the drive screw with a motor (not shown). In this manner, the angular position of the swashplate 20 is adjusted by rotating the drive screw 104 thereby causing the drive nut 102 to move axially therealong driving the ball fitting 100, as illustrated in FIG. 4. Movement of the ball fitting causes the variable angle swashplate 20 to pivot about the trunnions 96.

Figure 9:
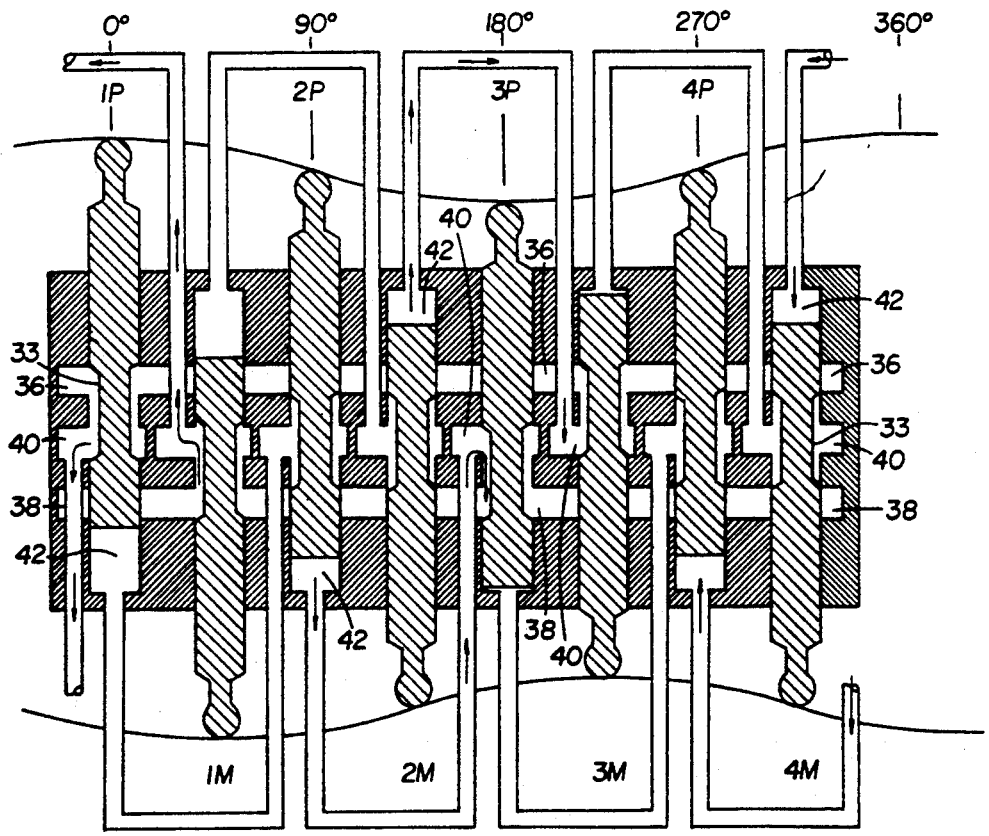
FIG. 9 is a schematic illustration showing the spool valve arrangement of the present invention.

As noted above, the piston chambers of the variable displacement unit 14 and the piston chambers of the fixed displacement unit 16 communicate with one another. A unique aspect of the invention is the manner in which each of the pistons serve the additional purpose of acting as a spool valve to establish this communication. This aspect of the invention is described with reference to FIGS. 3 and 9. FIG. 9 is a schematic illustration of the main drive unit 30 unfolded along the center of each of the piston chambers so as to show the cross section of each piston chamber. The sinusoidal trace on the left and right side of the Figure represents the movement of the pistons as dictated by the swashplates. For simplicity, only eight pistons are illustrated.

Disposed within the unit 30 are two independent reservoirs or manifolds: a left reservoir 36 and a right reservoir 38. Each of the reservoirs are defined by annular recesses provided in each of the piston bores, which circumscribe the entire unit, each forming a single reservoir which is manifolded to all pistons passing through it. Either reservoir may function as the high or low pressure reservoir depending on the mode of operation of the transmission. Each of the piston bores has a valve port 40, circumscribed therearound, located between left and right reservoirs 36 and 38, which does not communicate with the valve ports 40 of the other piston bores.

Each of the pistons 26, 28 includes an annular recess 33 which alternatively communicates the valve port 40 with either the left reservoir 36 or the right reservoir 38 to accomplish the spool valve function. Each of the fixed displacement unit and variable displacement unit piston chambers 42 communicates with the valve port 40 of the respective fixed displacement unit piston or variable displacement unit piston which is disposed ninety degrees thereto on the forward side thereof in terms of the piston stroke. For instance, referring to FIG. 9, the piston chamber 42 for the second variable displacement unit piston 2M communicates with the valve port 40 of the third variable displacement unit piston 3M. Correspondingly, the piston chamber 42 of the second fixed displacement unit piston 2P communicates with the valve port 40 of the third fixed displacement unit piston 3P. In this manner, the piston which is disposed ninety degrees forward in the stroke acts as a spool valve communicating the piston chamber with either the left reservoir 36 or the right reservoir 38.

In order to assist in the understanding of this concept, the following is an example of the fluid flow in a full operation cycle. Referring to FIG. 9, the first piston 1M is at the top of its stroke and the cylinder associated with it is filled with fluid from the left reservoir 36. Ninety degree forward from the first variable displacement unit piston 1M, the second piston 2M is on the downward stroke, forcing the fluid from its piston chamber 42 to the valve port 40 of the third piston 3M, which at that time is at the bottom of its stroke. Since the third piston is at the bottom of its stroke, the valve port 40 communicates with right reservoir 38 via the recess 34 in the spool valve of the third piston 3M. As noted above, the right reservoir 38 is a single reservoir which communicates with each of the piston chamber of the fixed displacement unit and variable displacement unit. Tracking the movement of the fluid in the right reservoir 38, it is noted that the first fixed displacement unit piston 1P is positioned at the top of its stroke such that the right reservoir 38 communicates with the valve port 40 via the spool valve recess 34, as illustrated. Thus, the fluid flows from the right reservoir 38 into the valve port 40 of the first piston 1P. From the valve port 4 of the first fixed displacement unit piston 1P, the fluid then flows to the piston chamber 42 of the fourth fixed displacement piston 4P which is on its upward stroke, thereby drawing the fluid into its piston chamber. Thus, we have tracked the fluid flow from the first piston 1M of the variable displacement unit to the fourth piston 4P of the fixed displacement unit. Just as the fluid in the piston chambers 42 of the variable displacement unit pistons are pumped to the piston chambers of the fixed displacement unit pistons, the fluid in the piston chambers of the fixed displacement unit piston is correspondingly pumped to the piston chambers of the variable displacement unit pistons.

As explained above, when the variable swashplate 20 is disposed at the same angle as the fixed swashplate 18, all of the fluid flows from the left reservoir 36 through the fixed displacement unit to the right reservoir 38, and vice versa. As the angle of the variable swashplate 20 approaches 0° the amount of fluid flow is reduced.

Figure 10:
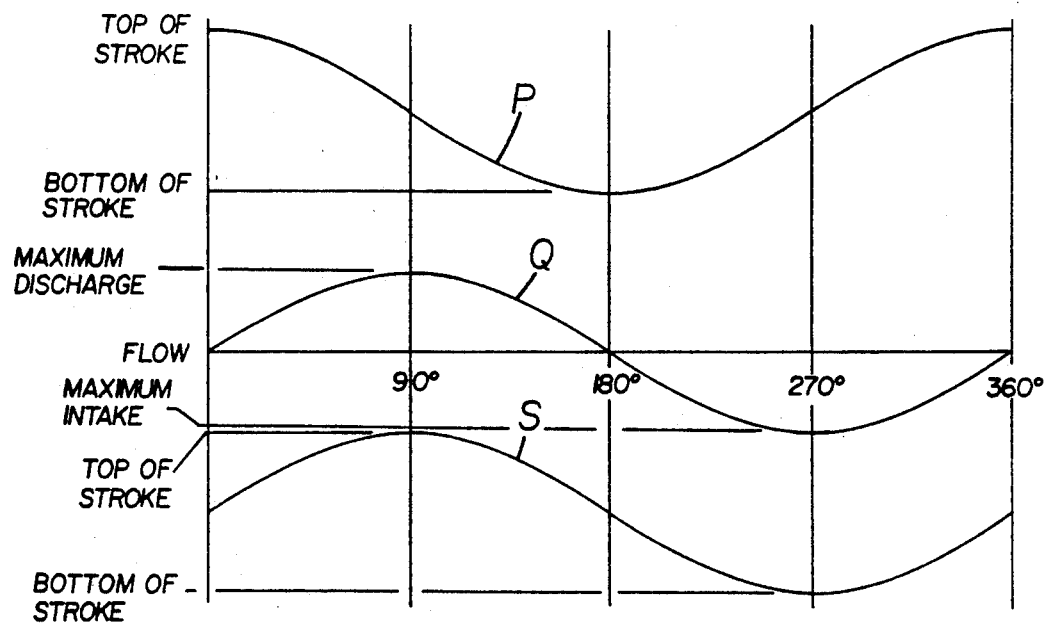
FIG. 10 is a chart illustrating the operation of the spool valve arrangement of the present invention.

The relationship between the piston position P, the flow rate Q, and the spool valve piston positions is illustrated on FIG. 10. Referring thereto, when the piston P is at the top of its stroke, the flow rate Q is zero and the piston acting as the spool valves is disposed at the middle of its stroke where the valve port 40 does not communicate with either the reservoir 38 or the reservoir 36. When the pumping piston P is at the center of its stroke (90°), where the flow Q is at a maximum, the spool valve piston S is at the end of its stroke where it provides the maximum valve opening communicating either the left reservoir 36 or the right reservoir 38 and the valve port 40. Finally, when the pumping piston P is at the bottom of its stroke where the flow Q is zero, the spool valve piston S is at the middle of its stroke where the valve port 40 does not communicate with left reservoir 38 or right reservoir 36. Accordingly, it can be seen that this control arrangement results in a valve opening proportional in size to the fluid flow rate.

With pistons provided in multiples of four, there are two pistons that are in the correct position to serve as control valve spools. One leads by 90° and one lags by 90°. If use of the leading piston as the control spool results in pumping from the right reservoir to the left reservoir, changing the fluid passages to use the lagging piston as the control spool reverses the direction and results in pumping from the left reservoir to the right reservoir. If both the fixed displacement unit and variable displacement unit are pumping in the same direction, the differential displacement is the sum of the two displacements rather than the difference. With units of equal displacement, ratios of 0 to 1 are produced if the flow from the units is in opposite directions. If the flow is in the same direction, the ratios fall between 1 and 2. Using different displacements, ratios less than 0 (reverse) and greater than two can be achieved. However, in either case, a ratio of 1:1 will always be one of the limits since direct drive occurs when the swashplate angle is at 0°.

Conventional axial piston pumps and motors utilize a ported valve plate keyed to the shaft which is fitted to and rotates against the ends of the cylinder barrel to control the flow into and out of the cylinders. Such an arrangement requires a very tight fit to minimize leakage, and, therefore, creates significant frictional loss as it rotates against the cylinder barrel and at its connection to the fluid input and output. In a differentially connected unit, such as this invention, it would require that this sliding motion occur continuously at the variable displacement unit since the valving must be registered with the fixed case, where the torque is reacted. The spool valves in this invention, in addition to providing superior sealing, maintains proper position of the valve by forces transmitted from the case to the valves through the anti-friction bearing.

The construction of the device is as follows. Referring to FIG. 4, the unit 30 is constructed of eleven separately fabricated sections which are individually illustrated in FIGS. 11-18. Beginning at the center of the unit 30 and extending in opposite directions therefrom, the unit 30 first includes a center plate 41, valve port plate 42L and 42R, a pair of manifold plates 44L and 44R, pump actuating cylinder plates 46L and 46R, and end plates 48L and 48R. The valve port plates 42L and 42R and bonded to the center plate 41; the pairs of manifold plates 44L and 44R are bonded together; and the end plates 48L and 48R are respectively bonded to the cylinder plates 46L and 46R. These groups of bonded together plates or sections form a plurality of separate tarnsverse core barrel segments interconnected together along the axis of the input shaft to form a unitary cylinder barrel core structure. The bonded segments are held together by a plurality of bolts 49 with the seals 120 (FIG. 3) providing the hydraulic seal, as described in detail below. Note that only the left side sections are illustrated, the right side plates merely being mirror images.

Referring to FIGS. 11 and 12, the cylinder plates 46L, 46R include a plurality of piston bores 50 (also referred to as chambers or barrels), axial fluid channels 52, and connecting channels 54. In the illustrated embodiment, there are sixteen piston bores, alternating piston bores being utilized for the fixed displacement unit pistons 28 and the variable displacement unit pistons 26, respectively. Additionally, there are eight axial channels 52 and eight connecting channels 54. Each of the connecting channels 54 communicate a piston bore 50 with an axial fluid channel 52 which, as well be described below, communicate with the valve port 40. In particular, for the left cylinder plate 46L, the connecting channels 54 connect the end of the fixed displacement unit piston bores 50 to the fluid channels 52 as illustrated. Correspondingly, for the right cylinder plates 46R, the connecting channels 54 connect the end of the variable displacement unit piston bores 50 to the fluid channels 52.

Figure 13:
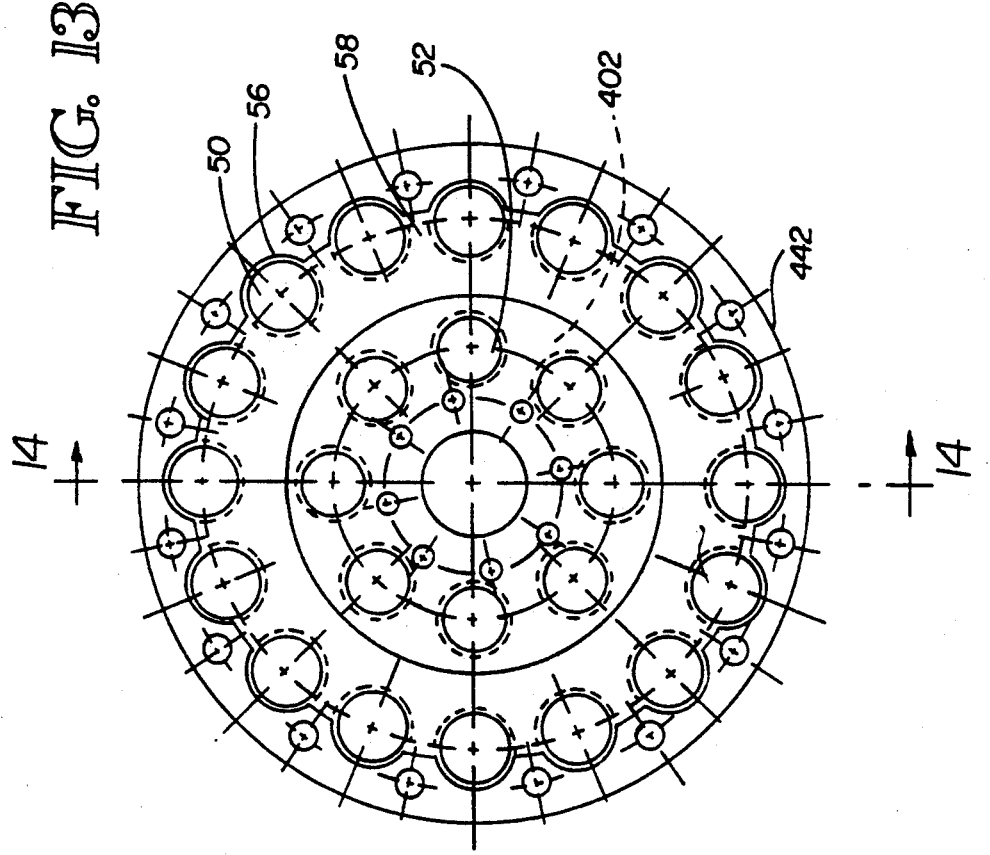
Figure 14:
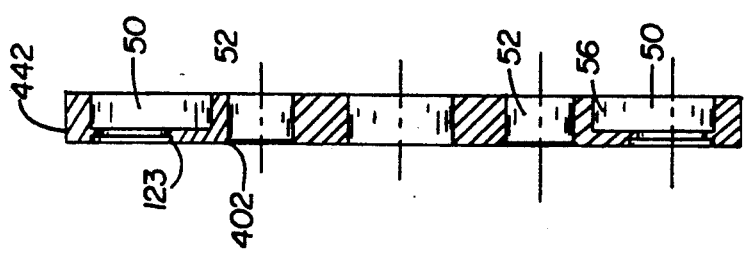

Referring now to FIGS. 13 and 14, the manifold plates 44L and 44R also include a plurality of piston bores 50 and a plurality of fluid channels 52. Additionally, each of the piston bores 50 have an annular recessed area 56 which communicate with each other to form the left and right reservoirs 36 and 38, respectively, circumscribing the entire manifold plate. As noted above, a pair of manifold plates 44L and 44R are sealed to one another as illustrated in FIG. 4.

Figure 15:
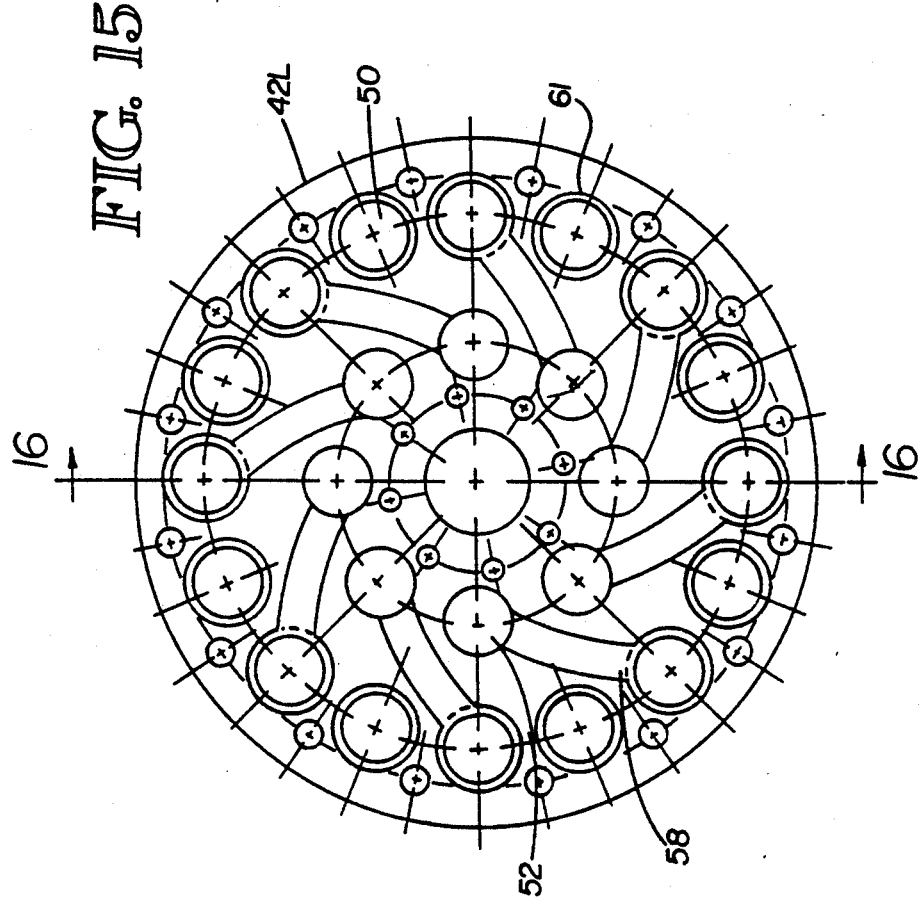
Figure 16:
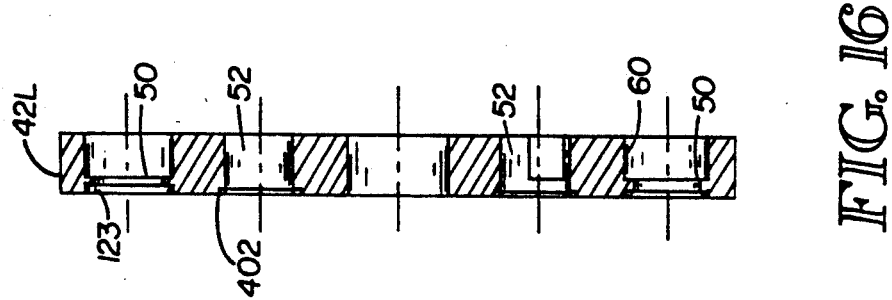

Referring to FIGS. 15 and 16, attached to the center plate 41 are the pairs of valve port plates 42L and 42R. The valve port plates in each pair are mirror images of one another for the appropriate alignment of the channels and piston bores. The valve port plates 42L and 42R include piston bores 50 and connecting channels 58 as illustrated. Additionally, each of the piston bores 50 include an annular recessed area 61 defining a portion of the valve port 40, discussed above. The connecting channels 58 are provided for connecting the fluid channels 52 to the piston bores 50 proximate the recessed area 60.

Figure 17:
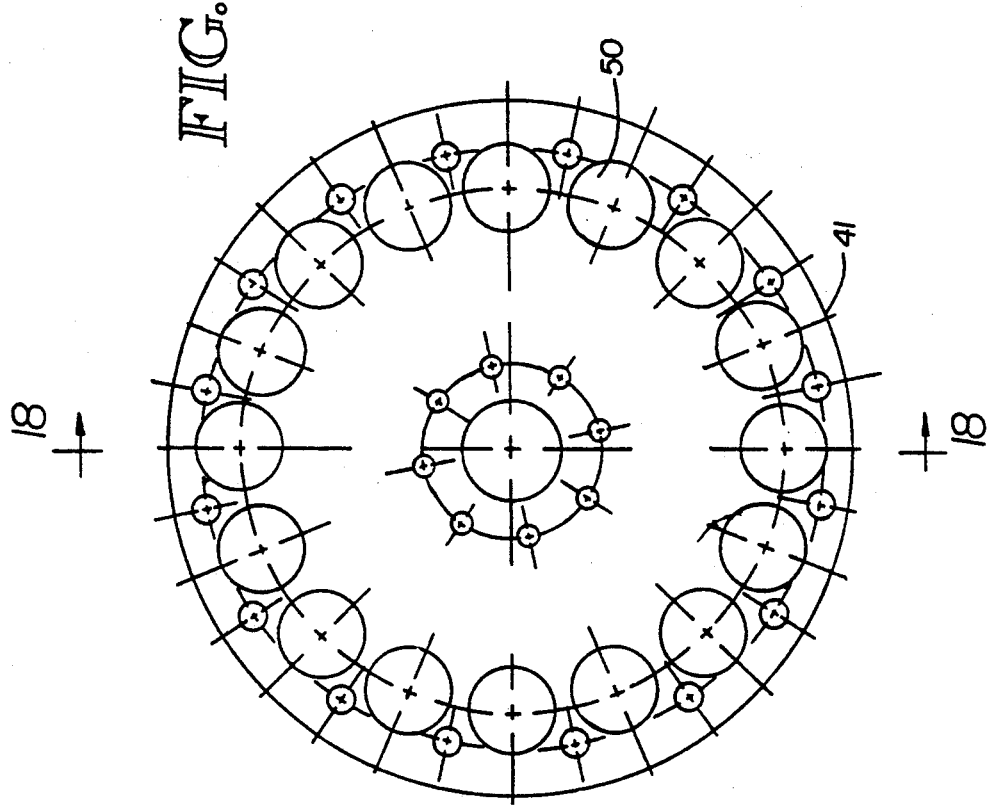
Figure 18:
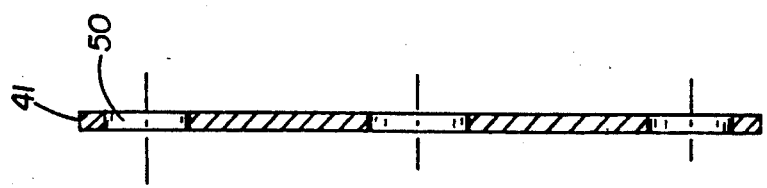

Finally, as illustrated in FIGS. 17 and 18, the center plate 41 is disposed at the center of the unit 30 between the pairs of valve port plates 42L and 42R. Center plate 41 seals the open sides of fluid channels 58 and the end of axial channels 52 in both valve port plates 42L and 42R. The center plate 41 includes a plurality of piston bores 50 having a recessed area 60 therein so as to define the remaining portion of the valve port 40.

Thus, as can be seen from the foregoing, the ends of each of the fluid bores communicate with the valve port defined by the center recesses 60 of the spool plate 421, 42R via the connecting channels 54 of the cylinder plates 46L, 46R, fluid channels 52, and connecting channels 58 of the valve port plate 42L, 42R, respectively.

Figure 19:
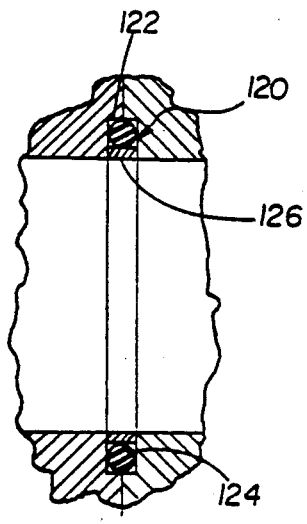
FIG. 19 is a detailed view of the piston seal arrangement, according to the present invention.
Figure 19A:
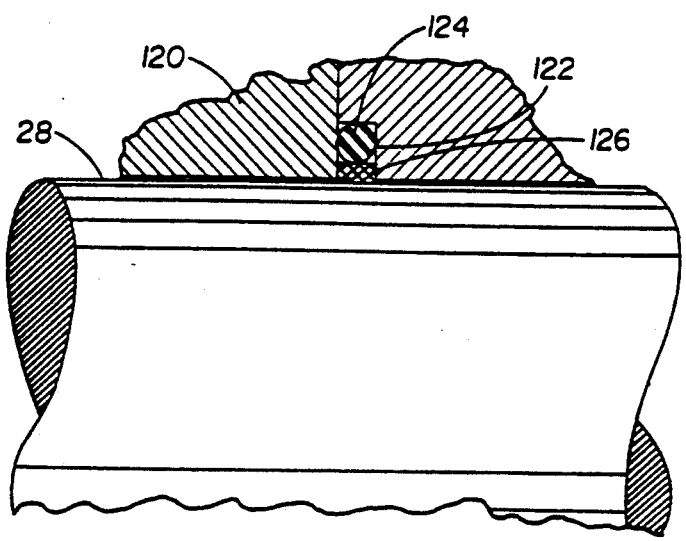
FIG. 19A is a detail view of the piston seal and piston management.

Grooves 402 for mounting elastomeric "O" rings 400 (FIG. 3) are provided in plates 46L, 46R, 44L and 44R to provide static seals to prevent leakage from fluid channel 52. In order to minimize leakage of hydraulic fluid from and between the reservoirs, a plurality of piston seals 120 are provided on opposite sides of each of the reservoirs 36, 38, as illustrated in FIG. 3, 11-16 and 19. Referring to FIG. 19, the piston seals are designed in the following manner. A groove 122 is provided in each of the piston bores at the appropriate position. Specifically, the cylinder plates 46L, 46R, manifold plates 44L, 44R and valve spool plates 42L, 42R each have a recess or seal cavity 123 circumscribing the connecting channels 54 as specifically illustrated in FIGS. 11-16. An elastomeric O-ring 124 and a piston ring 126 are provided in each of the grooves 122 with the O-ring circumscribing the piston ring. The grooves are formed by the mating together of the seal cavities 123 formed in the plate segments. The elastomer ring and piston ring are installed in these cavities prior to bolting the plate segments together.

Each of the piston rings 126 is preferably made out of cast iron and has a smooth inside diameter slightly less than the diameter of each of the pistons to provide a slight interference fit and provide a sliding cast iron bearing surface for the pistons. The width of the piston ring is slightly less that the mounting groove width and the outside diameter of the piston ring is appropriately sized to mate with the O-ring 124. Due to the small cross section of the piston ring, sufficient elastic deformation or stretch can be achieved to accommodate the slight interference fit. With such a design deformation of the O-rings 124 under fluid pressure creates a radial force on the O-rings urging them in sealing contact with groove 122 and piston ring 126, preventing leakage of hydraulic fluid between the groove and the piston ring and between the groove halves. The elasticity of the "O" ring allows the piston ring to deform and shift slightly to accommodate minor deviations in piston/valve spool roundness, straightness, and concentricity, and still maintain an effective seal.

Figure 22:
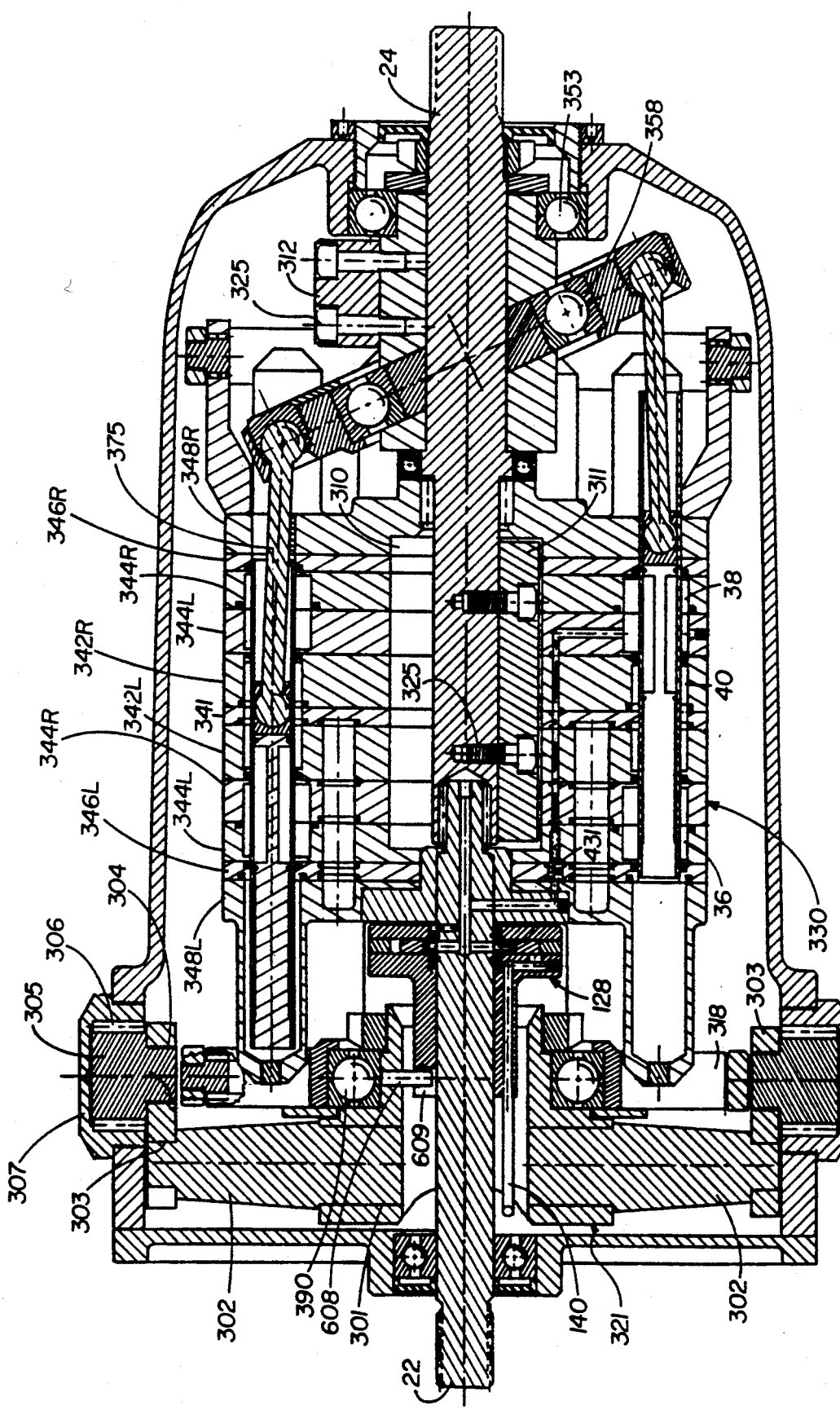
FIG. 22 is a sectional side view taken along 22—22 of FIG. 21.

In the preferred embodiment, as illustrated in FIGS. 22 and 23, the basic operation of the invention is as previously described. However, a number of the elements have been modified to provide improved performance, reduced size, and improved producibility, and improved dynamic balance.

The torque developed or transmitted by the piston and swashplate mechanism is equal to the hydraulic pressure and the displacement of the swashplate mechanism. The displacement is a product of the piston diameter, the number of pistons, and the piston stroke. The piston stroke is a function of the swashplate angle, however, as the swashplate angle is increased to increase the stroke the difference between the circular path traveled by the pistons and elliptical path traced by the intersection of the piston ends on the swashplate become quite large. Piston to swashplate connecting link 375, illustrated in FIG. 23, accommodates this difference while introducing only a very small piston side load. The increased stroke achieved through the utilization of this link significantly increases the torque developed by this mechanism without increasing the load that must be reacted by bearings 353, 358, and 390.

The construction of the piston/spool valve and the attachment means for the fixed displacement unit pistons are similar to that of the variable displacement unit. The construction is most easily understood by referring to FIG. 24 which is an enlarged cross section detail from FIG. 23 of the piston/valve and swashplate connection of the variable displacement unit.

Connecting link 375 has enlarged spherical ends of different diameters. The connecting link 375 is fixed to the swashplate 318 by clamping the larger diameter spherical end between bearing ring 376 and adjustable bearing seat 377 which is threaded to mate with threads in swashplate 318. Bearing seat 377 is tightened against the spherical end with sufficient force to eliminate any looseness but still allowing the link to pivot in its seat, thus eliminating a major source of noise.

Piston/spool valve 328 which slides on four cast iron bearing/sealing rings 322 is constructed to minimize discontinuities as the spool valve section passes through these rings. A hardened steel outer shell 380 contains a series of holes 378 which are aligned such that when the piston/spool valve is at the center of its travel the edges of holes 378 are located at the inner edge of the inner two bearing/sealing rings 322, preventing fluid flow between the center valve port 40 and both manifold ports 36 and 38. As the holes 378 pass the sealing/bearing rings 322 in either direction, fluid may enter the holes 378 from the central valve or manifold port at one end, pass through the cavity 379 within the valve, and exit the holes at the other end into the appropriate valve or manifold depending on rotational direction and whether the transmission is in a pumping mode or a motoring mode.

Metal retaining ring 381 is affixed in a groove in outer shell 380. Retaining ring 381 positions a two piece bearing ring 382. The smaller spherical end of connecting link 375 is restrained between split bearing ring 382 and bearing seat 383. The piston/spool valve inner core 384 contains grooves for mounting elastomeric "O" ring seal 385 to prevent leakage from the valve section. Between the seals the cross section is reduced to provide channel 379 which serves as a passageway for fluid entering holes 378 on one end and exiting holes 378 on the other end. The end of inner core 384 is threaded to engage with threads on the interior of piston/spool outer shell 380. These threads are used to adjust the force exerted on the spherical end of connecting link 375 by bearing ring 382 and bearing seat 383. The force being adjusted such that all looseness or end play is eliminated but the link may pivot within its seat. This eliminates a source of noise from this connection.

Piston/valve inner core 384 contains a cavity 389 in which in one embodiment contains a compressible material 386, such as urethane elastomers containing sealed air cavities and fluted sides 321 to allow application of fluid pressure over the length of the compressible component. This limits the maximum fluid pressure that can be generated in the transmission (see FIG. 41). For example in the pumping mode, as the fluid pressure increases in the cylinder 390, movement of the piston results in increased compression of the compressible material 386 rather than displacement of fluid out of the cylinder. This pumps less fluid causing a slight slippage between the input shaft and the output shaft. The compressible material 386 is held in place by a mesh disk 387 and a retaining ring 388 which is installed in a groove on the wall of the cavity 389 in the piston valve inner core 384.

In order to accommodate increased piston stroke and not exceed the space available for mounting the transmission in an automobile, the cylinder sections and swashplate of both the variable displacement and the fixed displacement units are designed such that the swashplate of the variable displacement unit is nested between the cylinders of the fixed displacement unit and the swashplate of the fixed displacement unit is nested between the cylinders of the variable displacement unit.

Figure 24:
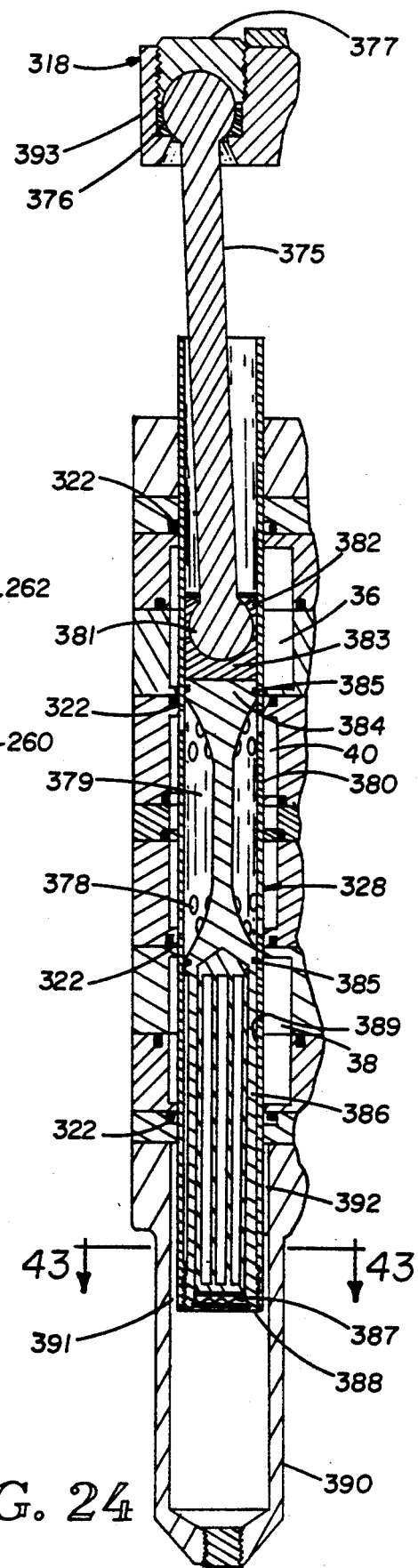
FIG. 24 is a detailed expanded view of the piston, swashplate, and connecting link.

Referring to FIG. 24, the cylinder 390 has a larger inside diameter than piston 328. As the piston 328 goes further into the cylinder 390 the fluid displaced is forced through the annular passage 391 to passage 392, shown on FIG. 26, where it is then routed to the appropriate center valve section.

Figure 25:
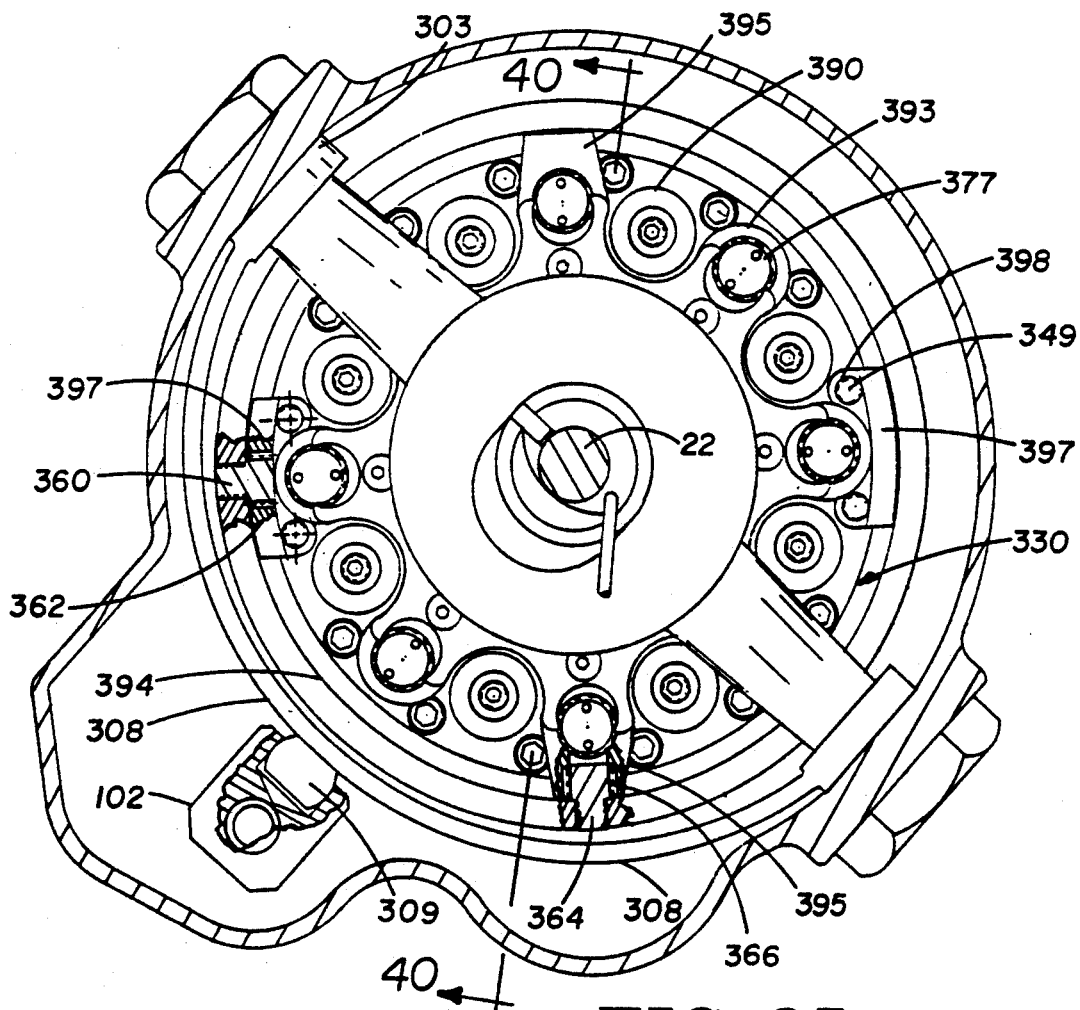
FIG. 25 is sectional view taken along line 25—25 of FIG. 23.

FIG. 25 illustrates the manner in which the variable displacement swashplate is constructed with lobes 393 provided for mounting the multiple bearing seats 377 and bearing rings 376 (see FIG. 24) which form the connection to end of link 375. These lobes, which serve to connect the swashplate mechanism to the piston/- valves of the variable displacement unit, are provided sufficient clearance that they may function between the projected cylinders 390 of the fixed displacement unit. Two of the lobes 395 which are diametrically opposed extend outward beyond the lobes 393 and contain pivot bearings 366 in which pins 364, which are fixedly attached to torque reaction ring 394, are fitted. Two other pins 360 are fixedly attached to torque reaction ring 394 at right angle to pins 364 and are fitted in pivot bearings 362 which are mounted in fittings 397. Fittings 397 are fixed to the unitary cylinder barrel structure (unit 330) by receiving the ends of four of the clamping bolts 349 in the threaded holes 398. Thus the torque reaction ring 394 maintains the swashplate 321 rotatably rigidly fixed to the main drive unit 330, while allowing the swashplate to be disposed axially, at any angular position. Since swashplate 321 is rotationally fixed all torque developed by the swashplate mechanism is transmitted through the torque reaction ring 394 and no side loads are induced on the piston/valves.

The swashplate construction and the torque reaction ring mounting of the fixed displacement swashplate is identical to that employed for the variable swashplate.

The variable angle swashplate assembly is designed in the following manner. Referring to FIGS. 22 and 23, the swashplate pivoting structure 321 consists of a cylindrical center section 301 on which the inner race of swashplate bearing 390 is mounted, a threaded section on which locknut 399 is threaded to clamp the inner race of bearing 390 securely to the structure. Arms 302 extend outward from the center section to the right in FIG. 22. At the outer extremity of the arms 302 two tabs 303 extend forward, each tab contains a threaded hole 304 the center of which are coincident with the center of the balls in swashplate bearing 390.

Trunions 305 are fixedly attached to the threaded holes of swashplate pivoting structure 321. Bearings 306 are mounted in bearing retainer 307 which is in turn fixedly attached by screw thread to outer case 330.

The angular position of the swashplate pivoting structure is controlled in the following manner. Referring to FIG. 25, the two tabs 303 are joined together by a semi-circular member 308 which functions as a control arm. Fixed to control member 308 at its midpoint is a spherically shaped fitting 309.

Fitting 309 fits into the cylindrical cavity in drive nut 102 and the positioning of the swashplate pivot structure is as previously described.

As shown in FIG. 23, the passageway through the cylindrical pivoting structure is fashioned with sufficient clearance to prevent interference with the input shaft 22 and the charging pump 128, when the swashplate pivoting structure is positioned at the maximum required angle.

Figure 35:
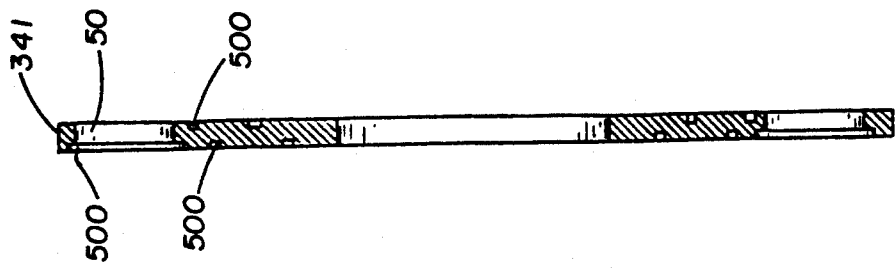

The unitary cylinder barrel core structure is comprised of eleven, transverse, separately fabricated, sections, preferably of a light weight easily fabricated metal such as aluminum. These sections are individually illustrated in FIGS. 26 through 35. Referring to FIGS. 22 and 35, beginning at the center of the unit 330 and extending in opposite directions therefrom, the unit 330 includes a center valve plate 341, valve port plates 342L and 344R, a pair of manifold plates 344L and 344R, cylinder sealing plate 346L and 346R and pump actuating cylinder section 348L and 348R. These sections are held together with a plurality of bolts 349 illustrated in FIG. 35.

The fluid flow, fluid passageways and channels are basically the same as previously discussed, however, rather than bonding mating sections together, grooves 500 (FIG. 30) for installing elastomeric "O" rings 501 are provided in the appropriate section as necessary to prevent fluid leakage between the different fluid passageways. Note that FIGS. 26 through 35 illustrate only the left side section. The right side plates merely being mirror images, with the exception of the "O" ring grooves which are in only one side. The side in which the "O" groove is located can be discerned from FIGS. 22 and 23.

The center hole in the interior plates has been enlarged as illustrated in FIGS. 22, 23, and 35 to provide a cavity 310 (FIG. 22) to accommodate dynamic balancing weight 311.

The symmetry of the swashplate mechanism provides a statically balanced unit, however, the angle of the fixed displacement swashplate unit shifts balance of the mass such that a force couple is generated as the output shaft is rotated. To balance this couple, weights 311 and 312 are attached to the output shaft 24 with bolts 325. The mass of the weights 311 and 312 (FIG. 22) is selected such that being on opposite sides of the shaft a static balance is maintained, and when output shaft 24 is rotated a force couple equal and opposite to that developed by the swashplate and the pistons is developed achieving a dynamically balanced unit.

Figure 36:
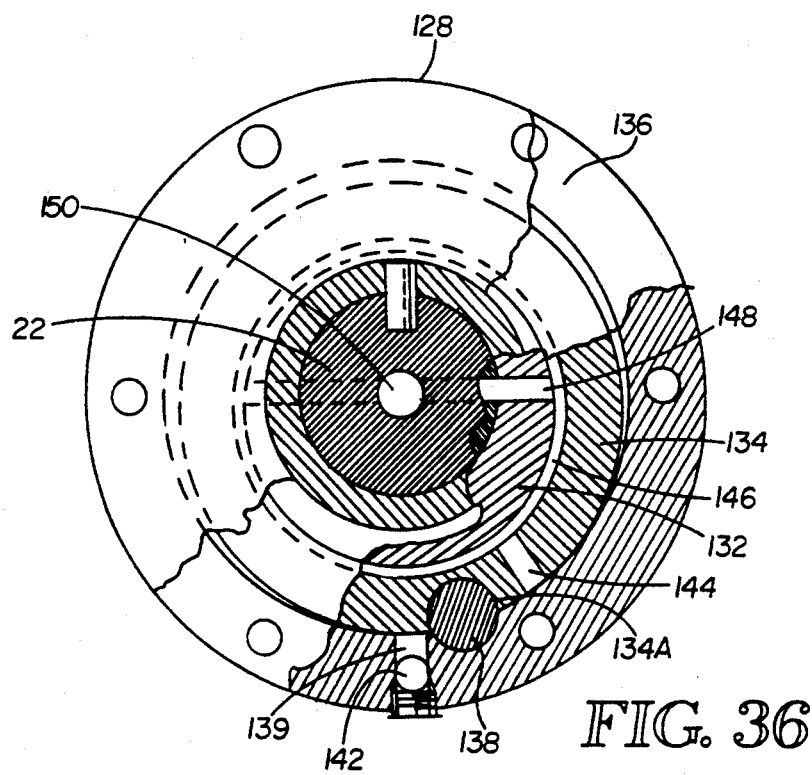
FIG. 36 is a detailed, sectional view of the fixed displacement unit for pumping fluid into the transmission taken along line 36—36 of FIG. 4, according to the present invention.
Figure 37:
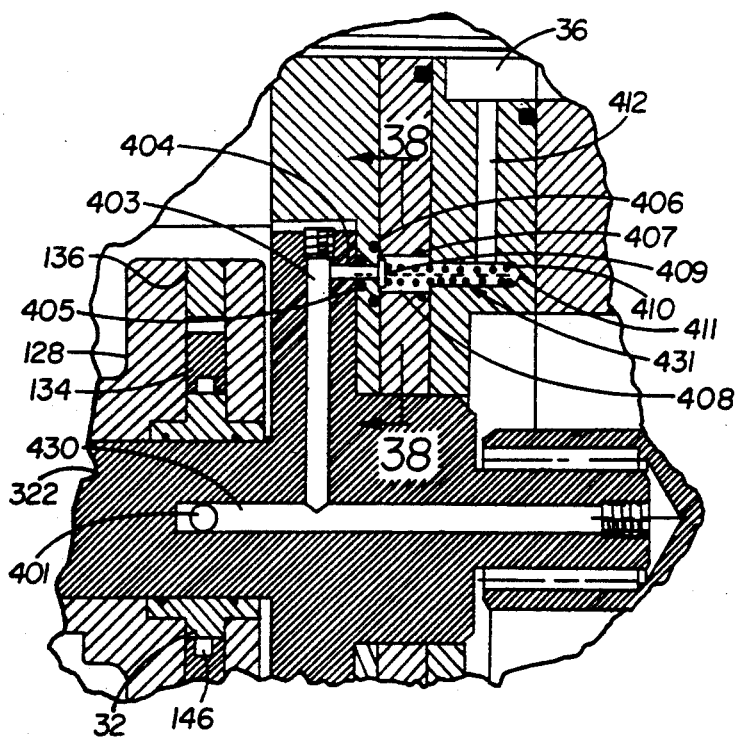
FIG. 37 is an expanded detailed view of pump 128 shown on FIG. 3 and FIG. 22.

To prevent fluid cavitation and provide fluid to replace the small leakage losses, both manifolds must be supplied pressurized fluid by the charging pump, since either manifold may be functioning as the low pressure manifold at any particular time. Referring to FIGS. 3 and 22, a charging pump 128 is provided for supplying the pressurized fluid to the transmission since, as noted above, these losses are relatively small, the displacement of the charging pump is correspondingly small. FIGS. 36 and 37 shows the elements of the charging pump. The charging pump generally includes an eccentric member 132, pumping ring 134 and case ring 136. The eccentric member 132 is fixedly secured to the input shaft 22 so as to rotate therewith. The eccentric member 132 is disposed inside the annular pumping ring 134 which is likewise disposed inside the annular case ring 136. A pin 138 engages the pumping ring 134 and case ring 136 so as to prevent the pump ring from rotating. Rotation of input shaft 22 produces a corresponding rotation of the eccentric member 132. The eccentric portion of the eccentric member 132 continuously contacts the pumping ring 134 urging the pumping ring in contact with the case ring 136 at one point. The contact point continuously circumscribes the inside of the case ring 136 as eccentric member 132 rotates with shaft 22. When the contact point is opposite (most remote from) pin 138, pump ring 134 moves along the pin in the direction of the contact point with the sides of the slot 134a in the pump ring 134 still in contact with pin 138 to prevent fluid from flowing past the pin 138.

As the point of contact between the pump ring 134 and the case ring 136 travels in a clockwise direction, a cavity of increasing size is formed between the pump ring, the ring case, and pin 138. Fluid is drawn into this cavity through a bore 139 radially provided in the case ring 136 communicating with passage 140 (FIG. 4) and the interconnecting drilled passages 142, also illustrated in FIG. 4. At the same time this cavity is being formed, another cavity of decreasing size is formed between the pump ring 134, the Case ring 136, and pin 138 on the other side of the contact point. As the cavity decreases in size, fluid is forced through a radial hole 144 provided in the pumping ring 134 and into an annular passage 146 between the eccentric member 132 and the pumping ring 136. This annular passage communicates with another radial hole 148 provided in the eccentric member 132, which communicates with an axially extending hole 150 in input shaft 22, such that the pressurized fluid flows thereto.

Figure 21:
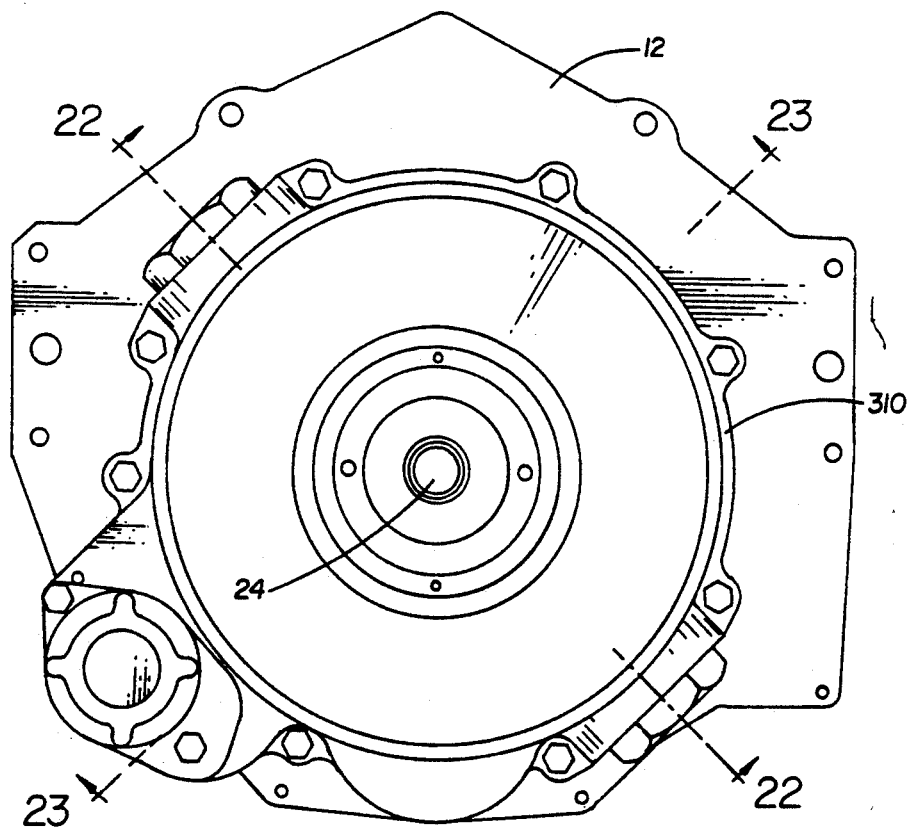
FIG. 21 is a rear view of the transmission of the preferred embodiment of the invention.

In the improved embodiment of the invention illustrated in FIGS. 21 and 22, charging pump 128 functions as previously described, however, to minimize the overall length of the transmission it is located between the variable displacement unit swashplate and the unitary cylinder barrel core structure. The outer case of the charging pump 128 is held stationary by a pinned connection to the swashplate pivot structure 321. Specifically pin 608 is fixedly attached to cylindrical center section 301, with the centerline of pin 608 being coincident with the centerline of the pivot trunions 305 in order that the position of the pin 608 does not shift as the swashplate pivot structure 321 is pivoted. The protruding end of pin 608 engages a slot 609 in the charging pump housing. Thus the charging pump housing is restrained from rotating.

Figure 38:
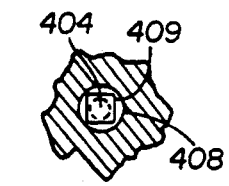
FIG. 38 is a sectional view taken along line 38—38 of FIG. 37.

FIG. 3 shows the fluid path from the axial hole 150 in the input shaft to the reservoirs 36, 38. Fluid is fed to both reservoirs via passages 151, 153. Specifically, passage 151 communicates the axial hole 50 with the reservoir 36 and passage 153 communicated the axial hole 150 to the reservoir 38. To prevent backflow from the high pressure manifold into the pumping circuit, check valves are installed between the pump and the manifolds. In order to achieve the best operation at all speeds, it is desirable that the design of the check valve be such that it is not affected by the wide variation in the centrifugal force to which it is subjected. This is accomplished by the check valve 431 illustrated in FIGS. 37 and 38.

Pressurized fluid from charge pump 128 enters input shaft 22 through hole 401 pressurizing cavities 430, 403, and 404. Valve seal 409 which is made of thin, compliant, smooth-surfaced metal is constrained by the walls of cylindrical cavity 409 such that the valve seal 409 covers the end of cylindrical cavity 404. Valve seal 409 is held lightly over the end of cavity 404 by spring 410 which is fitted into cylindrical cavity 411.

In operation when the fluid pressure in manifold 36 is less than the pressure being developed by charging pump 128, the pressure lifts valve seal 409 away from the end cavity 404, slightly compressing spring 410. Fluid then flows between the edges of seal 409 and the walls of cylindrical cavity 408. The fluid then passes through cavities 411 and 412 and into manifold 36. When the pressure in manifold 36 exceeds the pressure being developed by the charge pump this pressure acts against valve seal 409 to force it tighter over the end of cavity 404 and prevents the fluid from flowing into cavity 404.

An identical check valve 431 is placed for controlling pressure to manifold 38, as shown in FIG. 22.

Figure 40:
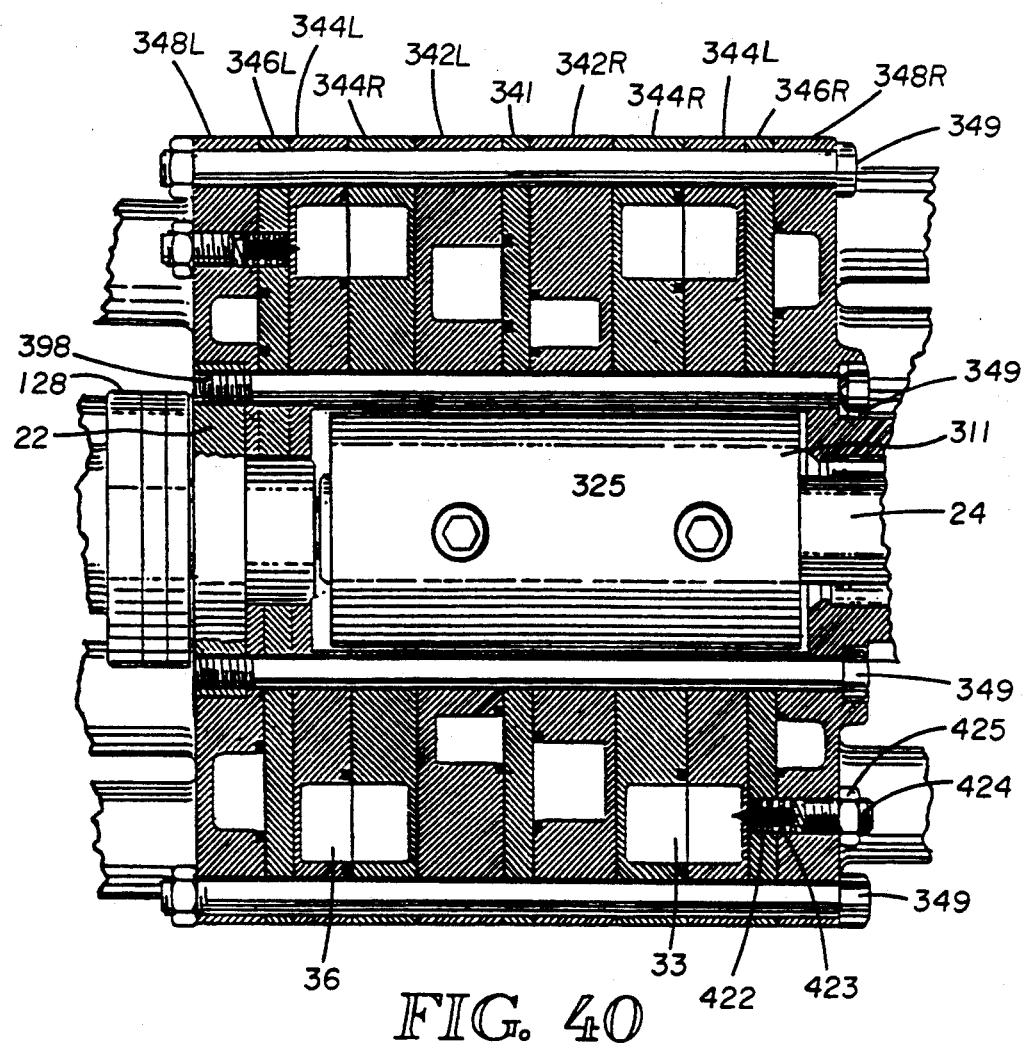
FIG. 40 is a detailed sectional view along line 40—40 of FIG. 25.

To prevent damage to the transmission unit by forces developed due to excessive fluid pressure which might be generated when the unit is at large reduction ratios, pressure relief valves 422 may be installed as shown in FIG. 40 to relieve the pressure in both manifolds 38 and 36 when the pressure reaches a predetermined level.

Figure 39:
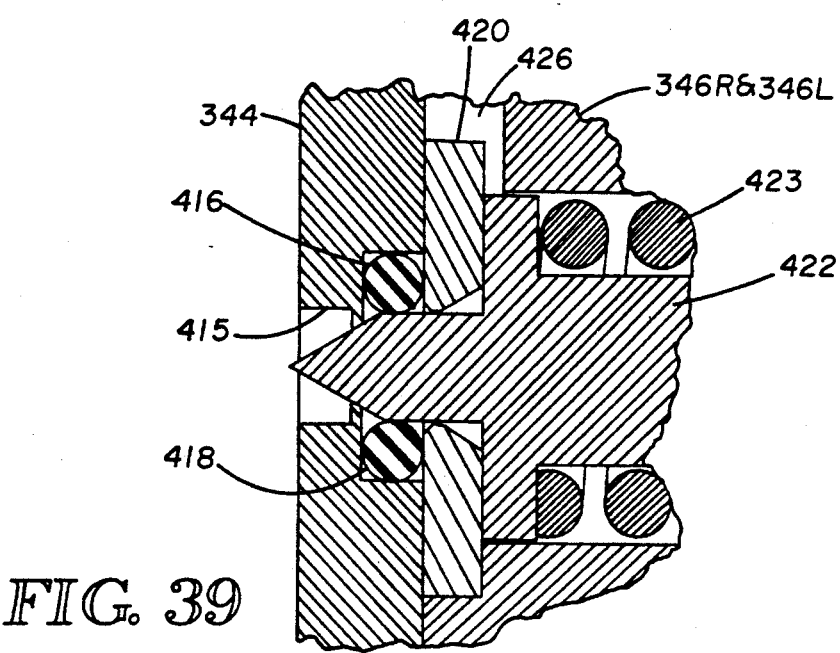
FIG. 39 is an expanded detailed view of the pressure relief valve shown on FIG. 38.

Referring to FIG. 39, a small hole 415 is contained in the manifold section of each plate 344L. An "O" ring mounting groove 416 concentric with hole 415 is contained in the outer surface of each plate 344L. "O" ring 418 is mounted in groove 416 and is held in position by disc 420 which is seated in a cavity in plate 346L. The small end of valve pintle 422 engages the inner diameter of "O" ring 418 to form a seal. The valve pintle 422 is held in place by spring 423 which is preloaded by a screw 424 (FIG. 40) which is mounted in a threaded hole in plate 348R. After adjustment of the spring to the proper preload, screw 424 is locked in position by nut 425.

Figure 26:
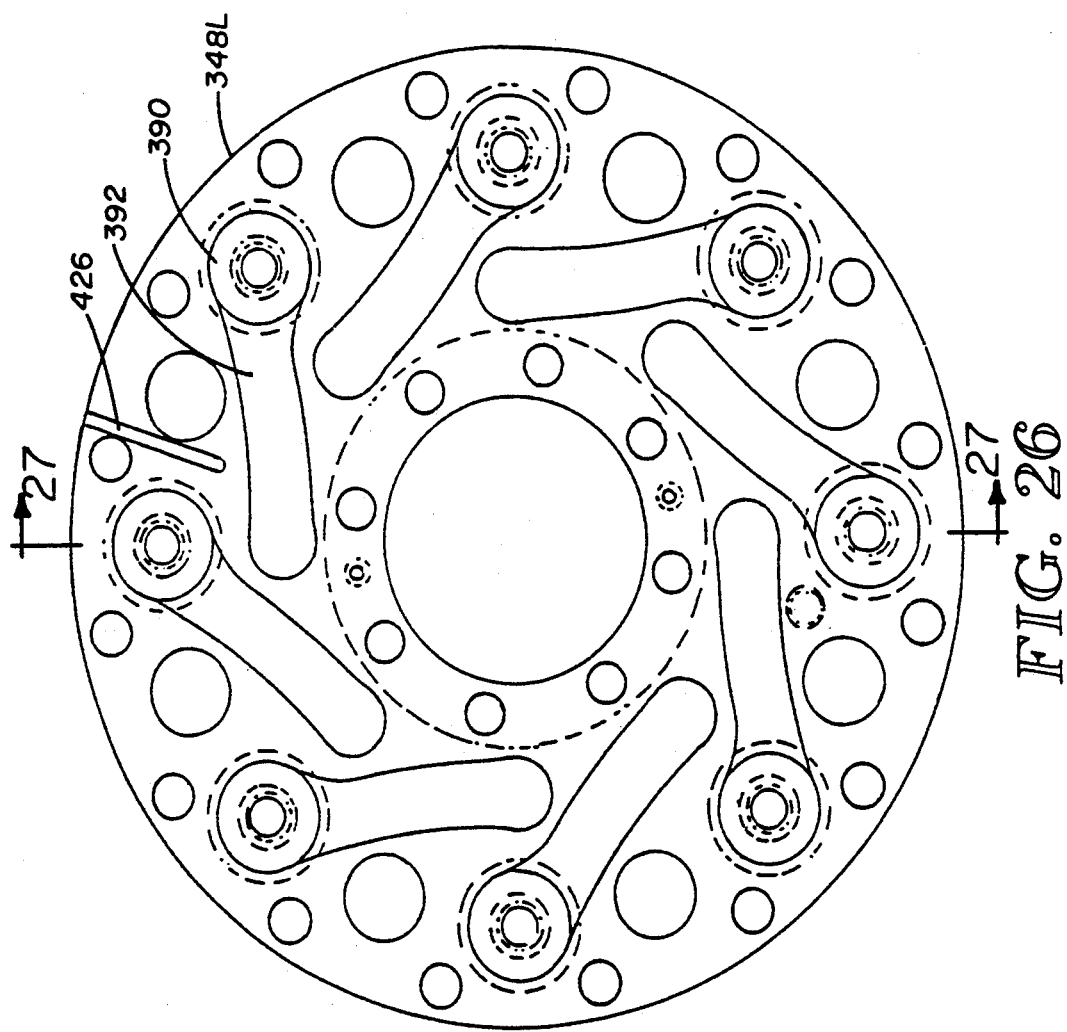
Figure 27:
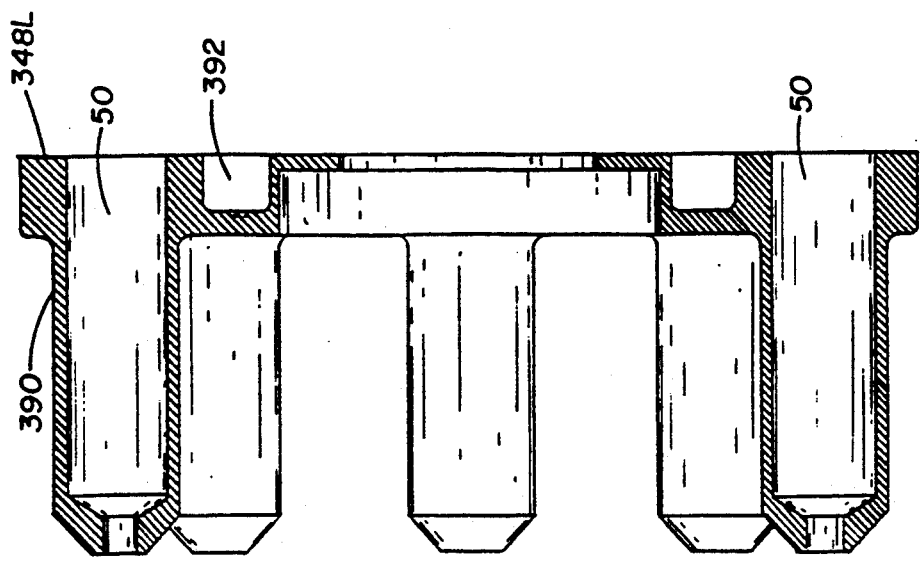
Figure 28:
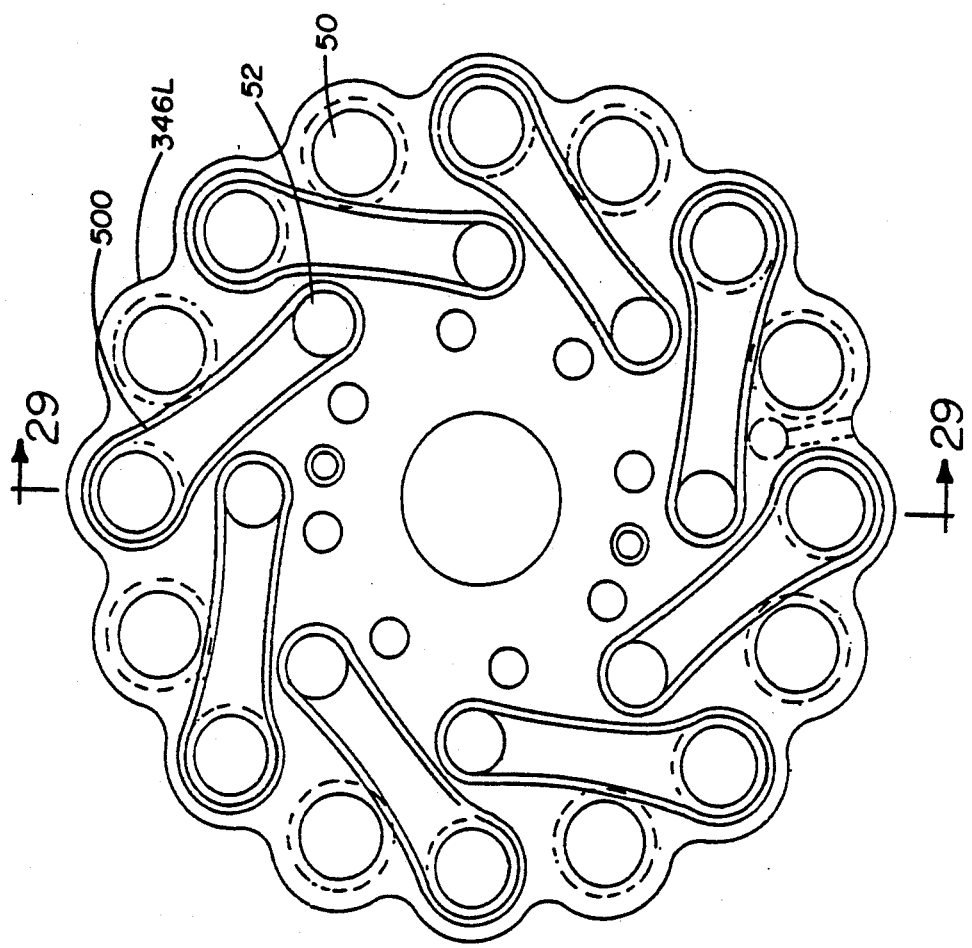
Figure 29:
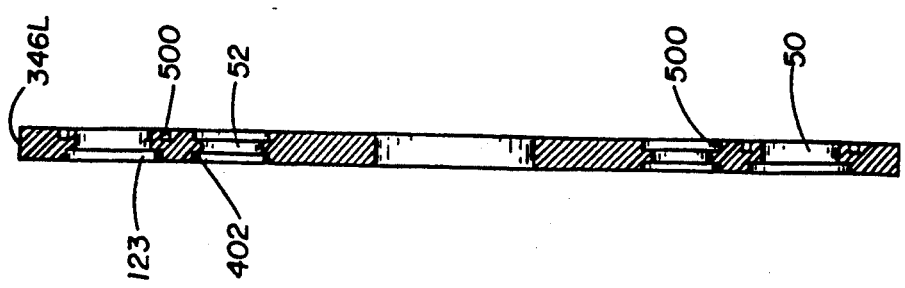
Figure 32:
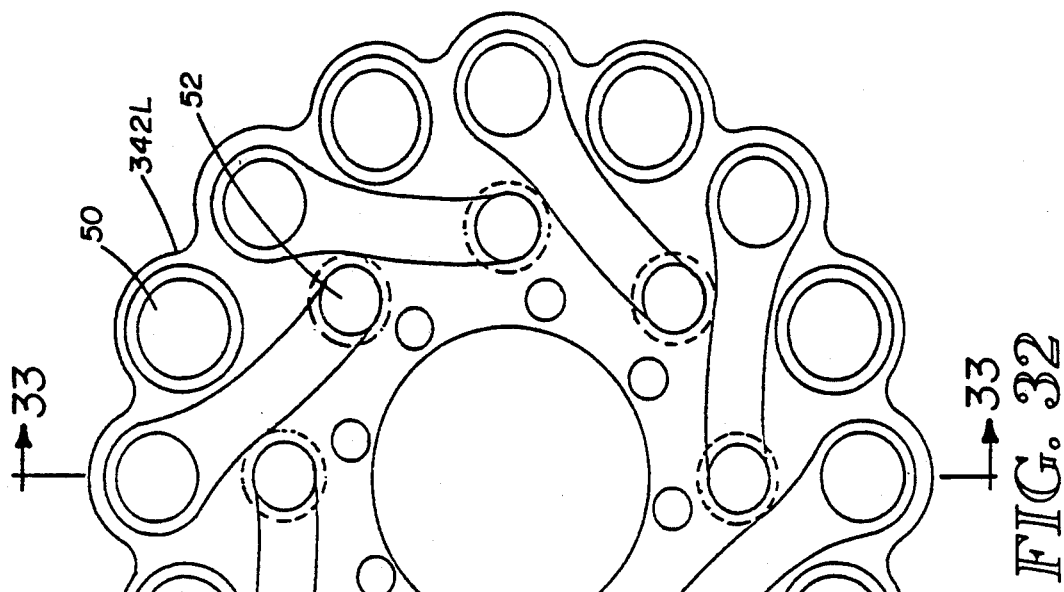
Figure 33:
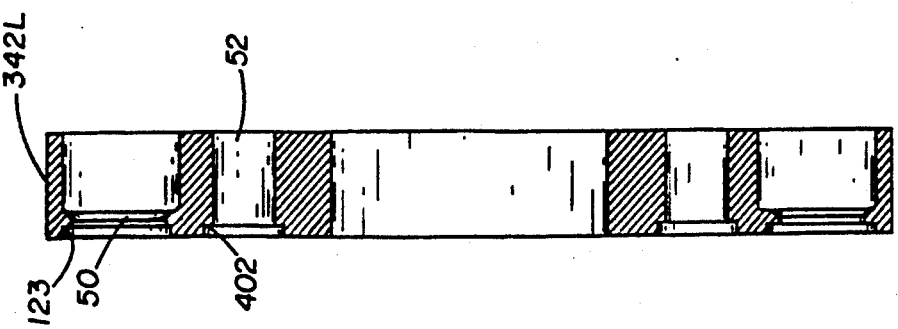
Figure 34:
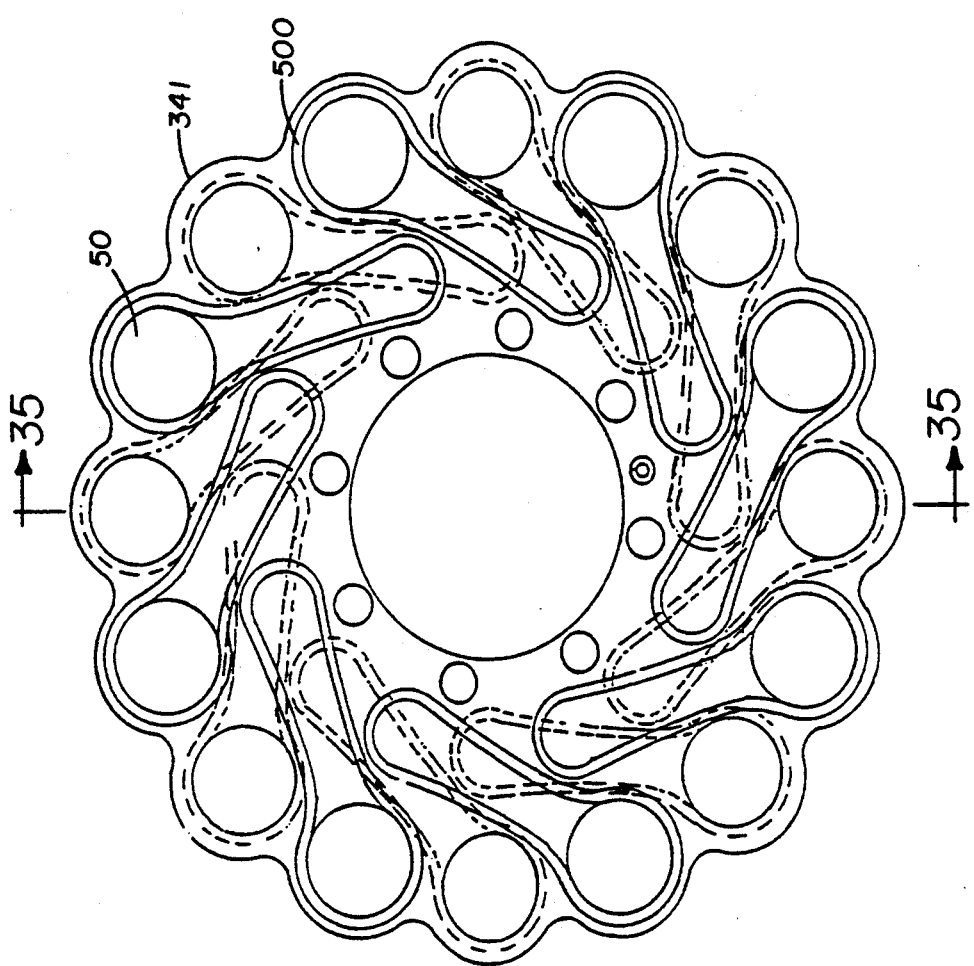

When the force resulting from the hydraulic pressure is sufficient to overcome the preload, spring 423 and valve pintle 422 moves outwardly allowing fluid to flow through hole 415 and escape through slotted passageway 426 in plate 346R and exhausted into the outer case 35, see FIG. 26.

Figure 41:
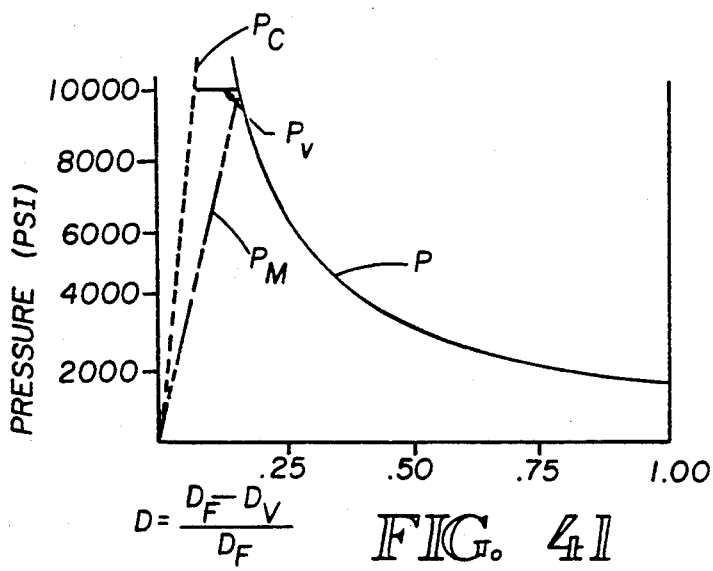

As shown by curve P on FIG. 41 for a given horsepower, as the differential displacement ratio decreases, the internal pressure increases until at $D=0$, the pressure would theoretically reach infinity. The maximum pressure that can be achieved is a function of fluid compressibility, fluid leakage and structural rigidity. This effect is shown by line Pc on FIG. 41. The effect of the pressure relief valves is shown by line Pv. The maximum pressure may also be limited by incorporating compressible material inside the piston (as illustrated in FIG. 24) the piston cylinder, or the fluid passageway between the piston cylinder and the control valve for that piston. The effect of adding compressible material is indicated by dashed line pm.

Limiting the maximum pressure that can be achieved, also, limits the amount of torque that can be transmitted. The line HP1 on FIG. 42 indicates the effect that the pressure limiting has on the available output shaft horsepower at low speeds.

Having explained the details of the invention, the following is an analytical discussion regarding the different modes of operation. The displacement, which is the volume of fluid displaced in one revolution of the pump, effects both pump/motor speed ($N=Q231/D$) and torque input/output $T=DP/2\pi$. As well as determining the quantity of fluid displaced, it can be seen that the term D (displacement) can be viewed as the mechanical advantage factor by which the mechanism converts shaft torque to pump pressure or vise versa, regardless of whether fluid is displaced or not.

In applying the standard hydraulic engineering formulas to the overall transmission, the displacement value D that must be used is the differential between the displacement of the variable and the fixed unit, since this is the net hydraulic energy transfer. The standard horsepower formula is:

$$HP = \frac{2\pi TN}{33000}$$

Torque can be expressed in terms of pressure P and displacement D as follows:

$$T = \frac{PD}{2\pi}$$

Substituting $PD/2\pi$ for T in the horsepower equation provides:

$$HP = \frac{2\pi PDN}{33,000}; \text{ or simplified}$$

$$HP = \frac{PDN}{33,000}$$

where $D = D_f - D_v$, or $$HP = \frac{P(D_f - D_v)N}{33,000}$$

This formula expresses the internal operating pressure as a function of the displacement D corresponding to the difference in displacement between the fixed and variable units.

Using the internal pressure P developed above, the formulas can be applied to the individual fixed displacement and variable displacement units, using the displacement $D_f$ & $D_v$, to determine the horsepower and torque developed by the variable displacement unit, the hydraulic horsepower delivered by the fixed displacement unit to the variable displacement unit, and the torque transmitting capability of the fixed displacement unit.

The expression for the relationship between input shaft speed and output shaft speed can be derived as follows. The quantity of fluid displaced by the variable displacement unit Qv and the fixed displacement unit Qf is:

$$Qv = Ni \tan \Theta v kd; \quad Qf = Ni - No \tan \Theta f kd,$$

where Ni is input speed, No is output speed, Θv is the angular position of the variable swashplate, Θf is the angular position of the fixed swashplate and Kd is a displacement constant.

Since the quantities displaced Qv and Qf must be equal, $$Ni \tan \Theta v kd = (Ni - No) \tan \Theta f kd.$$

The displacement constants Kd cancel and the expression is reduced to $$Ni \tan \Theta v = (Ni - No) \tan \Theta f$$

In operation in the automotive application, the invention functions in four different modes:
1. Neutral No=0
2. Direct drive No=Ni
3. Variable mode 0<No<Ni
4. Reverse No<0

Neutral

It can be seen from the expression Ni tan Θv=(Ni−No) tan Θf that No=0 when the angle of the fixed swashplate Θf equals the angle of the variable swashplate Θv, such that the displacement of the fixed and variable displacement units is the same. Input shaft 22 is rotated by the motor (not shown) which is coupled thereto. Rotation of the input shaft 22 causes the main drive unit 30 to rotate, which through torque reaction or link ring 94, causes the swashplate rings 92, 93 to rotate. Since swashplate 20 is fixed to the case, the resultant relative rotational motion between the main drive unit 30 and the swashplate 30 imparts the oscillating motion or "stroking" to the piston/valve spools.

The variable displacement unit operates at the input shaft speed, since its torque is reacted between the main drive body and the transmission case. Therefore, it is the controlling unit, whether it is functioning as a pump or a motor, in determining the quantity of fluid displaced.

In this mode, the variable displacement unit is functioning as a pump, pumping oil from the left reservoir and pressurizing the right reservoir. Since all cylinder passageways and reservoirs are initially filled and considering the fluid as incompressible, the same quantity must be displaced by the fixed displacement unit. Displacement of the quantity of fluid from right reservoir back to the left reservoir drives the fixed displacement unit as a motor. Since the displacements are the same in both the variable displacement and fixed displacement units, the fixed displacement unit is being driven with respect to the main drive unit in a reverse direction at the same speed resulting in a net speed of the output 24 shaft of zero. In this mode, while no power is being transmitted to the output shaft, the small amount of energy expended is hydraulic and the internal pressure is only that required to overcome the friction required to drive the fixed displacement unit under no load.

Direct Drive No=Ni

Using the expression $$Ni \tan \Theta v = Ni \tan \Theta f - No \tan \Theta f,$$

it can be seen that when the variable swashplate 20 is perpendicular to the Drive Unit such that Θv=0, tan Θv=0 and the expression reduces to Ni=No.

In this mode, the fixed displacement unit is functioning as a pump, pressurizing the left side reservoir. The piston/valve spools of the variable displacement unit are all in the center position, sealing all center valve ports from flow in either direction and no displacement can occur. The fixed displacement unit is hydraulically locked to the main drive unit 30 and the output shaft 24 rotates at the same speed as the main drive unit, which is the input speed.

In this mode, all this energy is transmitted mechanically and there is no movement of any hydraulic fluid or hydraulic components. There are two sources of energy loss in this mode.
1. Hydraulic leakage past the pistons and valves.
2. Friction losses in the bearing.

Utilizing the piston seal rings described previously, the hydraulic leakage can be kept below 1%. The total bearing friction of the four anti-friction bearings functioning in this mode can also be maintained below 1%, an overall efficiency of 98% to 99% can be achieved.

Variable Mode 0<No<Ni

Using No=Ni/2 as an example, it can be seen from the expression:

$$Ni \tan \Theta v = Ni \tan \Theta f - No \tan \Theta f IP$$

that tan hv for the variable displacement must be equal tan hf/2.

The fixed displacement unit functions as a pump pressuring the left side reservoir. Since the displacement of the variable unit is set at ½ the displacement of the fixed unit, the fixed unit will be allowed to rotate in the reverse direction with respect to the main drive unit at ½ the input shaft speed, resulting in an output shaft speed of Ni/2.

In this example, the differential arrangement, which is a power splitting device, transmits ½ the power directly mechanically to the output shaft 24 as a result of reaction torque developed between the output shaft 24 and the main drive 30. This torque and rotation produces hydraulic pressure and flow which is converted to mechanical power by the variable unit which is functioning as a motor. The torque generated by the variable unit is reacted between the main drive unit 30 and the transmission case 35. This torque is equal to the hydraulic reaction torque developed between the main drive unit and the output shaft. Since this torque has been transmitted from the case to the main drive unit, it is also available to be applied to the output shaft 24. The result is that when the output shaft speed is ½ the input shaft speed, the torque available at the output shaft 24 is twice the input shaft torque.

It can be shown by use of the formula HP=PDN/33,000 that the internal pressure, P, when the differential displacement D is one half that of full speed, will double if the horsepower applied is constant. Applying the expression T=DP/2π and the increased internal pressure value to the individual pump/motor units, torque between the output shaft and the main drive unit will be 2T or twice the input torque since its individual displacement is D and the pressure applied is 2P. The torque produced between the main drive unit and the case is equal to the input torque (T) since the pressure has been doubled but the displacement has been reduced to D/2 by varying the swashplate angle. The torque 2T at the output shaft 24 is the sum of input torque T transmitted directly to the main drive unit and hydraulic generated torque T added to the main drive unit by the variable displacement unit, and reacted at the transmission case.

Reverse N 0

From the expression $Ni \tan \Theta v = Ni \tan \Theta f - No \tan \Theta f$, it can seen that for the output shaft to rotate in the opposite direction to the input shaft, the value of tan hv must be greater than tan θf, thereby requiring the angle of the variable swashplate to be greater than the fixed swashplate. In this mode, the variable displacement unit functions as a pump with the right side reservoir functioning as the high-pressure reservoir and the left side reservoir functioning as the low-pressure reservoir. High pressure in the right side reservoir acts on the fixed displacement unit to drive it as a motor in the direction opposite the input rotation. Since the displacement of the variable unit exceeds that of the fixed unit, the speed of the output shaft with respect to the main drive unit will exceed that of the input shaft speed. Since this rotation is opposite the direction of rotation of the main drive unit, the net speed of the output shaft is in the reverse direction. In this mode of operation, all energy is being transmitted hydraulically.

The infinitely variable hydrostatic transmission of the invention provides superior performance at a very high efficiency. When the differential displacement is zero and no fluid is circulating, all the energy transfer is mechanical. In this mode, the only sources of energy loss are the anti-friction bearings 90 and 253, which react the thrust loads produced by the fluid pressure on the pistons, the support bearings 31 and 34, charging pump 124 load, drag from oil seals 31 and 34, and hydraulic leakage past the piston and valve seals. Each of these losses are small and in total can be maintained below 2%.

When the velocity ratio No/Ni is decreased, the input torque is transmitted mechanically to the output shaft while the increased torque is generated hydraulically. In this mode, slight additional friction and hydraulic flow losses are incurred.

Figure 42:
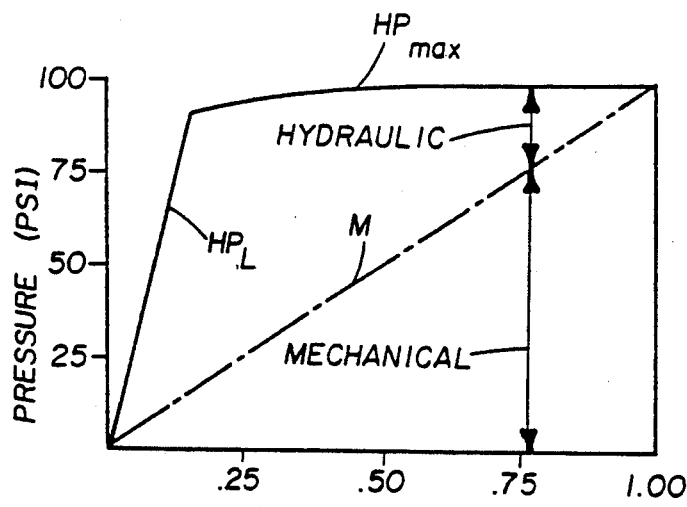
FIGS. 41 and 42 are charts illustrating the performance characteristics of the transmission.

The relationship between the differential displacement and the corresponding speed ratios and the mode of energy transfer is shown in FIG. 42. The diagonal line M represents the ratio of mechanical power to hydraulic power transmitted as a function of the ratio of the differential displacement, the portion below the line corresponding to mechanical power and the portion above the line corresponding to hydraulic power.

Taking into consideration the number of components and the size, complexity, strength, hardness, finish, and tolerance requirements, the cost of producing this transmission should be comparable to a manual transmission and less expensive than an automatic, since the function of the clutch and flywheel are also performed by this invention.

What is claimed is:

1. A differential hydrostatic transmission, comprising:
    an outer case;
    an input shaft and an output shaft rotatably disposed in said case;
    a first unit having a plurality of first pistons respectively slidably disposed in a plurality of first piston chambers therein, said first unit being fixedly attached to said input shaft so as to rotate therewith;
    a second unit having a plurality of second pistons respectively slidably disposed in a plurality of second piston chambers therein, said second unit being fixedly attached to said input shaft so as to rotate therewith;
    a first swashplate means connected to said first pistons and to said output shaft for converting oscillatory motion of said first pistons to rotational movement of said output shaft and vice versa, said first swashplate means being disposed at an angle with respect to the longitudinal axis of said first pistons;
    a second swashplate means connected to said second pistons for converting rotational movement of said second unit into oscillatory motion of said first pistons and vice versa, said second swashplate being angularly adjustable from a first position to a second position and being rotatably fixed to said outer case;
    means for communicating said second piston chambers with said first piston chambers and vice versa such that fluid pumped from said first piston chambers flows into said second piston chambers and fluid from said second piston chambers flow into said first piston chambers wherein the output speed and output torque of said output shaft is controlled by adjusting the angular position of said second swashplate means between said first position and said second position so as to correspondingly adjust the fluid displacement of said second unit with respect to said first unit;
    means for controlling the angle of said second swashplate means to provide an infinite range of output shaft speeds and torques;
    wherein said first swashplate means comprises:
    an alignment collar fixedly attached to said output shaft so as to be rotatable therewith;

an outer swashplate ring to which each of said first pistons are attached, said outer swashplate ring having pivot attaching means for connecting said first pistons to said outer swashplate ring in such a manner as to allow said outer swashplate ring to freely pivot in a sinusoidal manner with respect to said first pistons when said first pistons are oscillating;

antifriction bearing means for allowing said outer swashplate ring to rotate with respect to said alignment collar;

wherein said outer swashplate ring includes a plurality of spherical cavities disposed therein for respectively receiving an end of said first pistons and wherein said pivot attaching means comprises:

a plurality of pairs of semispherical segments respectively disposed in said cavities in such a manner that the planar surfaces thereof oppose one another, one of said segments in each of said pairs having a through-hole;

a plurality of end fittings respectively secured to the end of each of said first pistons, each of said fittings having an axial portion and a flat portion, said axial portion extending through said through-hole of said one segment, said flat portion being disposed between said opposing planar surfaces of said pair of segments; and antifriction sliding means disposed between said flat surface of each of said end fittings and said planar surface of the other of said segments in each of said pair of segments such that when said outer swashplate ring is disposed at an angle with respect to said first pistons, any forces exerted by said outer swashplate ring are aligned along the longitudinal axis of said first pistons.

2. A differential hydrostatic transmission, comprising:

an outer case;

an input shaft and an output shaft rotatably disposed in said case;

a first unit having a plurality of first pistons respectively slidably disposed in a plurality of first piston chambers therein, said first unit being fixedly attached to said input shaft so as to rotate therewith;

a second unit having a plurality of second pistons respectively slidably disposed in a plurality of second piston chambers therein, said second unit being fixedly attached to said input shaft so as to rotate therewith;

a first swashplate means connected to said first pistons and to said output shaft for converting oscillatory motion of said first pistons to rotational movement of said output shaft and vice versa, said first swashplate means being disposed at an angle with respect to the longitudinal axis of said first pistons;

a second swashplate means connected to said second pistons for converting rotational movement of said second unit into oscillatory motion of said first pistons and vice versa, said second swashplate being angularly adjustable from a first position to a second position and being rotatably fixed to said outer case;

means for communicating said second piston chambers with said first piston chambers and vice versa such that fluid pumped from said first piston chambers flows into said second piston chambers and fluid from said second piston chambers flow into said first piston chambers wherein the output speed and output torque of said output shaft is controlled by adjusting the angular position of said second swashplate means between said first position and said second position so as to correspondingly adjust the fluid displacement of said second unit with respect to said first unit;

means for controlling the angle of said second swashplate means to provide an infinite range of output shaft speeds and torques;

wherein said second swashplate means comprises:

an outer swashplate member pivotally secured to said outer case about a first axis so as to be pivotable from said first position to said second position;

an inner swashplate member connected to each of said second pistons, said inner swashplate member having a pivot attaching means for connecting said second pistons thereto in such a manner as to allow said inner swashplate member to freely pivot in a sinusoidal manner with respect to said second pistons when said second pistons are oscillating;

antifriction bearing means for allowing said inner swashplate member to rotate with respect to said outer swashplate member;

wherein said inner swashplate member includes a plurality of spherical cavities disposed therein for respectively receiving an end of said second pistons and wherein said pivot attaching means comprises:

a plurality of pairs of semispherical segments respectively disposed in said cavities in such a manner that the planar surfaces thereof oppose one another, one of said segments in each of said pairs having a through-hole;

a plurality of end fittings respectively secured to the end of each of said second pistons, each of said fittings having an axial portion and a flat portion, said axial portion extending through said through-hole of said one segment, said flat portion being disposed between said opposing planar surfaces of said pair of segments; and antifriction sliding means disposed between said flat surface of each of said end fittings and said planar surface of the other of said segments in each of said pair of segments such that when said inner swashplate member is disposed at an angle with respect to said second pistons, any forces exerted by said inner swashplate member are aligned along the longitudinal axis of said second pistons.

3. A device for securing a plurality of pistons to a swashplate so as to convert oscillating motion of said pistons to rotary motion of an output shaft, comprising:

an alignment collar fixedly attached to said output shaft so as to be rotatable therewith;

an outer swashplate ring to which each of said pistons are attached, said outer swashplate ring having pivot attaching means for connecting said pistons to said outer swashplate ring in such a manner so as to allow said outer swashplate ring to freely pivot in a sinusoidal manner with respect to said pistons when said pistons are oscillating;

antifriction bearing means for allowing said outer swashplate ring to rotate with respect to said alignment collar;

wherein said outer swashplate ring includes a plurality of spherical cavities disposed therein for respectively receiving said pistons and wherein said pivot attaching means comprises:

a plurality of pairs of semispherical segments respectively disposed in said cavities in such a manner that the planar surfaces thereof oppose one another, one of said segments in each of said pairs having a through-hole;

a plurality of end fittings respectively secured to the end of each of said pistons, each of said fittings having an axial portion and a flat portion, said axial portion extending through said through-hole of said one segment, said flat portion being disposed between said opposing planar surfaces of said pair of segments; and antifriction sliding means disposed between said flat surface of each of said end fittings and said planar surface of the other of said segments in each of said pair of segments such that when said outer swashplate ring is disposed at an angle with respect to said pistons, any forces exerted by said outer swashplate ring are aligned along the longitudinal axis of said pistons.

4. An axial piston infinitely variable differential hydrostatic transmission comprising:

an outer case torsionally coupled to the input power source;

an input shaft, a plurality of separate transverse core barrel segments interconnected together along the axis of the input shaft to form a unitary cylinder barrel core structure, said input shaft being fixedly attached to said core structure, said core structure including first and second piston chambers, first and second pistons, valve means, flow passages, high and low pressure manifolds, and valve ports for a fixed displacement pump/motor unit and a variable displacement pump/motor unit;

a first swashplate means maintained at a fixed angle with respect to the output shaft, said swashplate means having positive attachment means for positive attachment of the first pistons, to the first swashplate means of the fixed displacement pump/motor unit, said swashplate means thus providing the means to convert rotary motion of said output shaft with respect to the aforementioned unitary cylinder barrel core structure to axial oscillating motion of said first and second pistons and valving means and vice-versa, said first swashplate means also providing the means to positively maintain the desired position of the valve means of said fixed displacement pump/motor unit;

a second swashplate means pivotally attached and rotatable fixed to the outer case, and said second swashplate means having positive attachment means for positive attachment of the second pistons to the second swashplate means of the variable displacement pump/motor unit, said second swashplate means thus providing the means to convert rotary motion of the unitary cylinder barrel core structure to axial oscillatory motion of said pistons and vice-versa, said second swashplate means also providing the means to positively maintain the desired position of the valve means of said variable displacement pump/motor unit, said second swashplate means also providing means to transmit to said outer case reaction forces to the torque generated by the variable displacement pump/motor unit; and a means for controlling the angular position of said second swashplate means such that the displacement of said variable displacement pump/motor unit may be varied to achieve a continuous range of input to output shaft speed ratios from reverse to direct drive.

5. The transmission of claim 4 wherein the number of first and second pistons in both the positive displacement motor/pump unit and the variable displacement pump/motor unit is a multiple of four, and the valve means interconnects the enclosed end of the piston chambers to the aforementioned high and low pressure manifolds such that the oscillating motion of the pistons achieves a pumping or motoring action, said valve means including a portion of each of the said pistons fashioned to function as a shuttle spool valve, a central fluid port in said segments, each spool valve serving to connect the enclosed end of the piston chamber of a piston located ninety degrees from said spool valve alternately with a high pressure manifold contained within one of the transverse core barrel segments of the unitary cylinder barrel core structure and a low pressure manifold contained with a different transverse core barrel segment of said unitary cylinder barrel core structure;

the unitary cylinder barrel core structures also including a first end segment having at least two transverse sections sealed together and having closed end piston chambers in which the pistons of the aforementioned fixed displacement pump/motor unit intake and exhaust fluid, holes for through passage of the swashplate-connected-ends of the second pistons, holes for the through passage of clamping bolts and holes having a portion of the fluid passages which connect the said closed end piston chambers to the central fluid port coupled to the controlling spool valve;

a first manifold segment having at least two transverse sections sealed together and containing first end valve ports and an annular channel which manifolds one port of all spool valves together of both fixed displacement and variable displacement motor/pump units to a common first pressure, and containing portions of the fluid flow passage connecting the variable displacement motor/pump unit closed end piston chambers with the central fluid port of the controlling spool valve;

a center valve port segment having at least two sections sealed together, and containing said central fluid port for all variable and fixed displacement pump/motor unit spool valves, and having a portion of the fluid flow passages connecting the said central fluid port to the designated closed end piston chambers of both the variable and fixed displacement motor/pump units;

a second manifold segment having at least two sections sealed together and containing second end valve ports and an annular channel to manifold one port of all the spool valves of both the fixed and variable displacement pump/motor units to a common second pressure, and containing portions of the fluid flow passage connecting the fixed displacement unit closed end piston chambers with the central fluid port of the controlling spool valve; and a second end segment having at least two sections sealed together and containing closed end piston chambers in which the pistons of the aforementioned variable displacement pump/motor unit intake and exhaust fluid, holes for the through passage of the second swashplate means connected ends of the second pistons, holes for through passage of clamping bolts, and holes forming a portion of the fluid passages which connect the said closed end piston chambers to the central fluid port of the controlling spool valve.

6. The transmission of claim 5 wherein the segments of the unitary cylinder barrel core structure contain annular cavities for mounting a metal ring between each said segment in all cylinder barrels such that each piston is circumscribed by four such rings, said ring being of cast iron material to provide a low-friction, long-wearing surface compatible with the surface of the motor/pump unit pistons.

7. The transmission of claim 6 wherein means are provided to prevent fluid leakage between aforementioned axial segments of the unitary cylinder barrel core structure at the valve ports, said means comprising elastomeric O-ring static seals contained in the annular cavities in the said unitary cylinder barrel core structure segments, and circumscribing said cast iron rings, and also creating a low-friction, high pressure dynamic seal resulting from an interference fit between said rings and aforementioned spool valve pistons, said interference fit maintained by either the residual tension forces in said rings or compressive stress induced in the ring by the elastomeric "O" rings.

8. The transmission of claim 5 wherein the first swashplate means is statically balanced having its mass arranged symmetrically about the intersection of the center of rotation of said swashplate means and the center of rotation of the aforementioned output shaft, said first swashplate means including:
 a bearing consisting of a two piece axially segmented inner race, an outer race, two alignment collars each keyed to said output shaft and each having an end surface inclined with respect to said output shaft at the designed first swashplate means inclination angle;
 means for centering and rigidly clamping the aforementioned inner bearing race segments between the parallel inclined end surfaces of said alignment collars such that said inner bearing race serves as a wobble plate imparting a positive oscillating axial motion to the rotatably stationary fixed outer bearing race;
 said first swashplate means being rigidly fixed to said outer bearing race and including a positive attachment means for entrapping the ends of the pistons and for imparting axial oscillatory motion to the pistons and valve spools thereof of the aforementioned fixed displacement pump/motor unit;
 a means for axially fixing the said alignment collars to the said outer shaft; and
 bearing means for transmitting the axial forces applied to said alignment collars to the outer case.

9. The transmission of claim 5 wherein the variable displacement pump/motor unit second swashplate means transmits the axial and torsional forces developed by the reaction of the variable displacement pump/motor unit pistons acting on the second swashplate means to the aforementioned outer case through an antifriction bearing and includes:
 a bearing consisting of an inner race and an outer race;
 an annular second swashplate means retainer ring which fixedly retains said inner bearing race and contains said positive attachment means to impart axial oscillatory motion to the piston and valve spools thereof of said variable displacement pump/motor unit; and
 an annular outer ring fixedly attached to said outer bearing race of said second swashplate means containing bearing means for pivoting said outer bearing race about pivot pins fixed in the aforementioned outer case with the centerline of said pivot pins lying in the plane of the center of the piston positive attachment means, such that said outer bearing race serves as the wobble plate to impart positive axial oscillatory motion through the rolling balls to the rotating inner bearing race.

10. The transmission of claim 9 wherein means is provided to vary and maintain the angle of the aforementioned variable displacement pump/motor unit second swashplate means, said means comprising:
 a spherical fitting fixed to said annular outer bearing race retainer ring at a right angle to the centerline of the said pivot pins;
 a threaded cylindrical member rotatably mounted and axially fixed to aforementioned outer case;
 a coupling member containing a cylindrical bore of a diameter to match said spherical fitting and internally threaded to match said threaded cylindrical member; and
 a means for rotating said cylindrical member.

11. The transmission of claim 5 wherein a means in provided to react the radial and torsional force component generated by the application of the axial piston force to the inclined first and second swashplate means such that all forces normal to the centerline of the pistons of the fixed and variable displacement motor/pump units are effectively eliminated, such means comprising:
 said piston to swashplate positive attachment means including an outer swashplate ring having a plurality of spherical cavities disposed therein for respectively receiving an end of said pistons, a plurality of pairs of semispherical segments respectively disposed in said cavities in such a manner that the planar surfaces thereof oppose one another, one of said semispherical segments in each of said pairs having a through-hole;
 a plurality of end fittings respectively secured to the end of each of said pistons, each of said fittings having an axial portion and a flat portion, said axial portion extending through said through-hole of said one semispherical segment, said flat portion being disposed between said opposing planar surfaces of said pair of semispherical segments;
 antifriction sliding means disposed between said flat surface of each of said end fittings and said planar surface of the other of said semispherical segments in each of said pair of semispherical segments such that when said outer swashplate ring is disposed at an angle with respect to said first pistons, any forces exerted by said outer swashplate ring are aligned along the longitudinal axis of said first pistons; and
 a torque reaction ring member having diametrically spaced connecting points wherein a first set of connecting points of the torque reaction ring member is pivotally mounted to the outer swashplate ring with a bearing means and a second set of connecting points of the torque reaction ring member also contains bearing means and is pivotally mounted to the unitary cylinder barrel core structure, the centerline of said bearing means being disposed at a right angle to each other and contained in a plane which passes through the intersection of the center of rotation of said second swashplate means with the center of rotation of said unitary cylinder barrel core structure.

12. The transmission of claim 4 further comprising a charge pump means comprised of:
   an eccentric member fixedly secured to said input shaft and being rotatable therewith;
   a pumping ring circumscribing said eccentric member;
   a case ring circumscribing said pumping ring to define an annular area there-between except for a single contact point at which a circumferential portion of said pump ring contacts said case ring at a position proximate the eccentric portion of said eccentric member;
   means for preventing said pumping ring from rotating with respect to said case ring;
   means to prevent fluid flow past the single contact point; and
   means for introducing fluid into said annular area such that when said eccentric member is rotated by said input shaft said contact point circumscribes said case ring drawing fluid into a portion of said annular area and simultaneously pumping fluid from another portion of said annular area.

13. The transmission of claim 5, wherein means are provided to increase the swashplate angle and piston stroke and to react the radial and torsional force component generated by the axial piston force to the inclined first and second swashplate means such that only an insignificant force normal to the centerline of the pistons remains, such means comprising:
   said piston to swashplate attachment means including a plurality of attachment links having enlarged spherical larger and smaller spherical ends;
   the larger spherical end of said attachment means is clamped between a spherical bearing ring and a spherical bearing seat which is threaded into the outer swashplate ring;
   and the smaller spherical end is clamped between a split spherical bearing ring and a spherical bearing seat in the piston;
   and torque reaction ring member having diametrically spaced connecting points wherein a first set of connecting points of the torque reaction ring member is pivotally mounted to the outer swashplate ring with a bearing means and a second set of connecting points of the torque reaction ring member also contains bearing means and is pivotally mounted to the unitary cylinder barrel core structure, the centerline of said bearing means being disposed at a right angle to each other and contained in a plane which passes through the intersection of the center of rotation of said second swashplate means with the center of rotation of said unitary cylinder barrel core structure.

14. The transmission of claim 7 wherein means are provided to minimize the discontinuities as the valve section of the piston passes through the cast iron rings, such means comprising a piston composed of a hardened smooth finished outer shell, a series of holes through the outer shell in the valve portion of the piston, a groove for mounting a metal retaining ring in on end, and an internal thread on the other end;
   an inner piston core with grooves for mounting elastomeric O-ring to prevent fluid leakage from the valve section, a reduced cross sectional area to provide a channel for fluid flow through the valve section, and a threaded end for engaging the internal threads in the end of the piston shell, and a flat surface to bear against the spherical valve seat which clamps the spherical end on the piston connecting link against the split spherical bearing and the retaining ring mounted in the groove in the piston shell.

15. The transmission of claim 14 wherein means are provided to limit the maximum fluid pressure which can be developed internally in the transmission, such means consisting of a compressible, material contained within the pressurized area between the piston and its control valve, such areas include the piston, the piston cylinder and associated passageways.

16. The transmission of claim 12 wherein means are provided to limit the maximum fluid pressure Which can be developed internally in the transmission, such means consisting of a pressure relief valve installed to allow the escape of fluid from both manifolds when the pressure exceeds a preset limit.

17. The transmission of claim 12 wherein a means is provided to prevent fluid flow back to the charge pump when the pressure in the manifolds exceed the charge pump pressure such means being unaffected by the variation of the centrifugal forces in the rotating transmission.

18. The transmission of claim 13 wherein the overall length of the transmission is reduced by configuring the swashplate of the variable displacement unit to function within the same axial space as the individually extended piston cylinder of the fixed displacement unit;
   and configuring the fixed displacement swashplate to function in the same axial space as the individually extended piston cylinder of the variable displacement unit.

19. The transmission of claim 4 wherein the dynamic unbalance of the rotating fixed displacement unit is offset by the addition of two masses attached to the shaft of the fixed displacement unit;
   such masses being of a size and position such that a static balance is maintained, but a force couple equal to and opposite that of a fixed displacement unit dynamic unbalance is generated.

20. The transmission of claim 5 where a pattern of grooves for installing elastomeric O-ring is provided on the abutting surfaces of the transverse sections of the cylinder barrel core structure, such that when the plurality of transverse sections are clamped together by bolts, the hydraulic integrity of the individual pressure chambers and flow passageways is assured.

* * * * *